(12) United States Patent
Cross

(10) Patent No.: US 9,681,703 B2
(45) Date of Patent: Jun. 20, 2017

(54) FOOTWEAR WITH FLEXIBLE AUXETIC SOLE STRUCTURE

(71) Applicant: NIKE, Inc., Beaverton, OR (US)

(72) Inventor: Tory M. Cross, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 48 days.

(21) Appl. No.: 14/564,797

(22) Filed: Dec. 9, 2014

(65) Prior Publication Data

US 2016/0157557 A1 Jun. 9, 2016

(51) Int. Cl.
*A43B 13/22* (2006.01)
*A43B 1/00* (2006.01)
(Continued)

(52) U.S. Cl.
CPC .......... *A43B 13/223* (2013.01); *A43B 1/0009* (2013.01); *A43B 3/0073* (2013.01);
(Continued)

(58) Field of Classification Search
CPC ..... A43B 13/26; A43B 13/223; A43B 13/184; A43B 13/131; A43B 13/188;
(Continued)

(56) References Cited

U.S. PATENT DOCUMENTS 503,062 A 8/1893 Norwood
2,580,840 A 1/1952 Rikard
(Continued)

FOREIGN PATENT DOCUMENTS

EP 0207063 12/1986
GB 2455167 A 6/2009
(Continued)

OTHER PUBLICATIONS

International Search Report and Written Opinion mailed Apr. 1, 2016 in PCT Application No. PCT/2015/055635.
International Search Report and Written Opinion mailed Jan. 29, 2016 in PCT Application No. PCT/US2015/055642.
Partial Search Report mailed Jan. 22, 2016 in PCT Application No. PCT/US2015/055635.
(Continued)

*Primary Examiner* — Anna Kinsaul
*Assistant Examiner* — Jocelyn Wu
(74) *Attorney, Agent, or Firm* — Quinn IP Law

(57) ABSTRACT

An article of footwear may include a sole structure comprising an outer member and a plurality of ground engaging members, including a first ground engaging member. The ground engaging members extend substantially downward from the outer surface of a sole structure. Ground engaging members, or cleats, may be auxetic structures that can increase their dimensions in a direction that is orthogonal to the direction of applied force or tension. The ground engaging members may comprise a series of faces joined along hinge portions that allow ground engaging members to flatten and expand significantly. The first ground engaging member may have a substantially three-pointed star-shaped pyramidal structure. The outer member may have a more elastic material than the material comprising the faces of ground engaging member. The outer member may have an inner surface with apertures that correspond with the ground engaging members of the outer surface.

25 Claims, 17 Drawing Sheets

(51) Int. Cl.
  *A43B 3/00* (2006.01)
  *A43B 13/12* (2006.01)
  *A43B 13/14* (2006.01)
  *A43B 13/18* (2006.01)
  *B33Y 80/00* (2015.01)
  *A43C 15/14* (2006.01)

(52) U.S. Cl.
  CPC ............ *A43B 13/122* (2013.01); *A43B 13/14* (2013.01); *A43B 13/181* (2013.01); *A43B 13/184* (2013.01); *A43B 13/187* (2013.01); *A43B 13/188* (2013.01); *A43C 15/14* (2013.01); *B33Y 80/00* (2014.12)

(58) Field of Classification Search
  CPC ..... A43B 13/187; A43B 13/122; A43B 13/14; A43B 1/0009; A43B 3/0073; A43C 15/14; A43C 15/16; A43C 15/168; B33Y 80/00
  USPC .......................................................... 36/25 R
  See application file for complete search history.

(56) References Cited

U.S. PATENT DOCUMENTS

| | | | |
|---|---|---|---|
| 2,627,676 A | 2/1953 | Hack | |
| 2,963,722 A | 12/1960 | Stix | |
| 3,626,532 A | 12/1971 | Frank | |
| 3,745,600 A | 7/1973 | Rubico et al. | |
| 3,757,436 A | 9/1973 | Winkler et al. | |
| 4,340,626 A | 7/1982 | Rudy | |
| 4,375,728 A | 3/1983 | Dassler | |
| 4,535,553 A * | 8/1985 | Derderian | A43B 13/181 36/28 |
| 4,668,557 A * | 5/1987 | Lakes | B29C 44/357 264/321 |
| 4,753,021 A | 6/1988 | Cohen | |
| 4,756,098 A | 7/1988 | Boggia | |
| 4,999,931 A | 3/1991 | Vermeulen | |
| 5,197,206 A | 3/1993 | Shorten | |
| 5,337,492 A | 8/1994 | Anderie | |
| 5,918,338 A | 7/1999 | Wong | |
| 6,151,804 A | 11/2000 | Hieblinger | |
| 6,276,073 B1 * | 8/2001 | Curley, Jr. | A43B 5/001 36/127 |
| 6,412,593 B1 | 7/2002 | Jones | |
| 6,826,852 B2 | 12/2004 | Fusco | |
| 6,862,820 B2 | 3/2005 | Farys et al. | |
| 7,089,690 B2 * | 8/2006 | Krstic | A43B 3/0042 36/141 |
| 7,132,032 B2 | 11/2006 | Tawney et al. | |
| 7,146,752 B2 | 12/2006 | Pasternak et al. | |
| 7,160,621 B2 * | 1/2007 | Chaudhari | B60R 19/18 293/120 |
| D541,017 S | 4/2007 | McClaskie | |
| 7,254,906 B2 | 8/2007 | Morris et al. | |
| 7,287,343 B2 | 10/2007 | Healy | |
| 7,546,698 B2 | 6/2009 | Meschter | |
| 7,574,818 B2 | 8/2009 | Meschter | |
| 7,596,889 B2 | 10/2009 | Pasternak et al. | |
| D612,610 S | 3/2010 | Gonzalez | |
| 7,770,307 B2 | 8/2010 | Meschter | |
| 7,814,852 B2 | 10/2010 | Meschter | |
| 7,870,681 B2 | 1/2011 | Meschter | |
| 7,870,682 B2 | 1/2011 | Meschter et al. | |
| D643,196 S | 8/2011 | Young | |
| 8,002,879 B2 | 8/2011 | Hook | |
| 8,074,418 B2 | 12/2011 | Thiagarajan | |
| 8,084,117 B2 | 12/2011 | Lalvani | |
| 8,122,616 B2 | 2/2012 | Meschter et al. | |
| 8,132,340 B2 | 3/2012 | Meschter | |
| 8,225,530 B2 | 7/2012 | Sokolowski et al. | |
| 8,266,827 B2 | 9/2012 | Dojan et al. | |
| 8,277,719 B2 | 10/2012 | Alderson et al. | |
| 8,312,645 B2 | 11/2012 | Dojan et al. | |
| 8,375,604 B2 | 2/2013 | Eder | |
| 8,388,791 B2 | 3/2013 | Dojan et al. | |
| 8,490,299 B2 | 7/2013 | Dua et al. | |
| 8,544,197 B2 | 10/2013 | Spanks et al. | |
| 8,631,589 B2 | 1/2014 | Dojan | |
| 8,652,602 B1 | 2/2014 | Dolla | |
| D716,027 S | 10/2014 | Kirschner | |
| 2004/0111922 A1 * | 6/2004 | Fusco | A43B 13/12 36/59 R |
| 2004/0181972 A1 | 9/2004 | Csorba | |
| 2005/0252037 A1 | 11/2005 | Hofmann | |
| 2005/0252038 A1 | 11/2005 | Braunschweiler | |
| 2008/0011021 A1 | 1/2008 | Starbuck et al. | |
| 2008/0209766 A1 | 9/2008 | Braunschweiler | |
| 2009/0064536 A1 | 3/2009 | Klassen et al. | |
| 2009/0064540 A1 | 3/2009 | Sokolowski | |
| 2009/0119820 A1 | 5/2009 | Bentham et al. | |
| 2009/0241369 A1 | 10/2009 | Votolato | |
| 2009/0307932 A1 * | 12/2009 | Kirby | A43B 13/223 36/134 |
| 2010/0095551 A1 | 4/2010 | Gupta et al. | |
| 2011/0119956 A1 | 5/2011 | Borel et al. | |
| 2011/0168313 A1 | 7/2011 | Ma et al. | |
| 2011/0247237 A1 | 10/2011 | Jara | |
| 2012/0021167 A1 | 1/2012 | Plant | |
| 2012/0023686 A1 | 2/2012 | Huffa et al. | |
| 2012/0129416 A1 | 5/2012 | Anand et al. | |
| 2012/0159810 A1 | 6/2012 | Klassen | |
| 2012/0180341 A1 | 7/2012 | Crowley, II | |
| 2012/0181896 A1 | 7/2012 | Kornbluh et al. | |
| 2012/0233878 A1 | 9/2012 | Hazenberg et al. | |
| 2012/0315456 A1 | 12/2012 | Scarpa et al. | |
| 2013/0071583 A1 | 3/2013 | Evans et al. | |
| 2013/0081305 A1 | 4/2013 | Byrne | |
| 2013/0160324 A1 | 6/2013 | Peyton et al. | |
| 2013/0328440 A1 | 12/2013 | Kornbluh et al. | |
| 2014/0053311 A1 | 2/2014 | Nordstrom et al. | |
| 2014/0059734 A1 | 3/2014 | Toronjo | |
| 2014/0101816 A1 | 4/2014 | Toronjo | |
| 2014/0109286 A1 | 4/2014 | Blakely | |
| 2014/0165427 A1 | 6/2014 | Molyneux et al. | |
| 2014/0173938 A1 | 6/2014 | Beye et al. | |
| 2014/0237850 A1 | 8/2014 | Hull | |
| 2015/0075033 A1 * | 3/2015 | Cross | A43B 13/22 36/103 |
| 2015/0075034 A1 * | 3/2015 | Cross | A43B 13/22 36/103 |
| 2015/0245683 A1 * | 9/2015 | Cross | B32B 27/065 36/103 |
| 2015/0245685 A1 * | 9/2015 | Cross | A43B 13/187 36/104 |
| 2016/0157558 A1 * | 6/2016 | Cross | A43B 13/14 36/25 R |

FOREIGN PATENT DOCUMENTS

| | | |
|---|---|---|
| GB | 2463446 A | 3/2010 |
| WO | 03022085 A2 | 3/2003 |
| WO | 2004052136 | 6/2004 |
| WO | 2007052054 A1 | 5/2007 |
| WO | 2012171911 A1 | 12/2012 |
| WO | 2014018500 | 1/2014 |
| WO | 2015041796 | 3/2015 |

OTHER PUBLICATIONS

International Search Report and Written Opinion mailed Jan. 28, 2016 in PCT Application No. PCT/US2015/055652.
International Search Report and Written Opinion for Application No. PCT/US2014/052038, mailed Dec. 4, 2014.
Office Action mailed Jun. 15, 2016 for U.S. Appl. No. 14/565,143.
Office Action mailed Aug. 30, 2016 for U.S. Appl. No. 14/564,694.

* cited by examiner

FOOTWEAR WITH FLEXIBLE AUXETIC SOLE STRUCTURE

CROSS-REFERENCE TO RELATED APPLICATIONS

This application is related to co-pending U.S. patent application Ser. No. 14/564,694, filed Dec. 9, 2014 and published as US 2016/0157553, titled "Footwear with Flexible Auxetic Ground Engaging Members," the entirety of which is herein incorporated by reference. This application is also related to co-pending U.S. patent application Ser. No. 14/565,143, filed Dec. 9, 2014 and published as US 2016/0157558, titled "Footwear with Auxetic Ground Engaging Members," the entirety of which is herein incorporated by reference.

BACKGROUND

The present embodiments relates generally to a sole structure for an article of footwear and, more particularly, to an article of footwear with ground engaging members. It is advantageous, when participating in various activities, to have footwear that provides traction and stability on the surface upon which the activities take place. Accordingly, sole structures for articles of footwear have been developed with traction systems that include ground engaging members to provide traction on a variety of surfaces. Examples include cleated shoes developed for outdoor sports, such as soccer, football, and baseball. In some cases, the shape and orientation of ground engaging members on a sole structure may be configured particularly for forward and rearward traction.

SUMMARY

In one aspect, the present disclosure is directed to a sole structure for an article of footwear, the sole structure comprising an outer member and a plurality of ground engaging members extending away from a base portion of the sole structure. The plurality of ground engaging members include a first ground engaging member, where a free end of the first ground engaging member is an apex. The first ground engaging member includes a first configuration and a second configuration, where the apex has a first height with respect to the base portion in the first configuration, and the apex has a second height with respect to the base portion in the second configuration. The first height is greater than the second height, where the second height is approximately zero, such that the first ground engaging member is substantially flat in the second configuration. The sole structure at least partially comprises an auxetic structure, and the plurality of ground engaging members are arranged on the outer member to provide the sole structure with the auxetic structure.

In another aspect, the present disclosure is directed to an article of footwear, including a sole structure, where the sole structure includes an outer member and a plurality of ground engaging members extending from a base portion of the outer member. The plurality of ground engaging members comprise at least a first ground engaging member. The first ground engaging member has a first face and a second face, where the first face and the second face are joined along a first hinge portion, where the first hinge portion is comprised at least partially of a portion of the outer member, and where the first face is attached to the base portion of the outer member, and where the second face is attached to the base portion of the outer member. The first face has a first hardness, and the outer member has a second hardness, where the first hardness is different from the second hardness. The sole structure at least partially comprises an auxetic structure, and the plurality of ground engaging members are arranged on the outer member to provide the sole structure with the auxetic structure.

In another aspect, the present disclosure is directed to an article of footwear, including an upper and a sole structure. The sole structure includes an outer member and a plurality of ground engaging members disposed along a base portion of the outer member. The plurality of ground engaging members include a first ground engaging member, a second ground engaging member, and a third ground engaging member, and a plurality of panels attached to the base portion of outer member. The plurality of panels include at least a first panel, where the first panel being at least partially bounded by the first ground engaging member, the second ground engaging member, and the third ground engaging member. The sole structure at least partially comprises an auxetic structure, where the first ground engaging member, the second ground engaging member, and the third ground engaging member expand horizontally upon compression. Furthermore, the first ground engaging member moves about a first hinge portion relative to the first panel upon expansion of the first ground engaging member, the second ground engaging member moves about a second hinge portion relative to the first panel upon expansion of the second ground engaging member, and the third ground engaging member moves about a third hinge portion relative to the first panel upon expansion of the third ground engaging member.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The embodiments can be better understood with reference to the following drawings and description. The drawings are schematic and, therefore, the components in the figures are not necessarily to scale, emphasis instead being placed upon illustrating the principles of the embodiments. Moreover, in the figures, like reference numerals designate corresponding parts throughout the different views.

DETAILED DESCRIPTION

Figure 1:
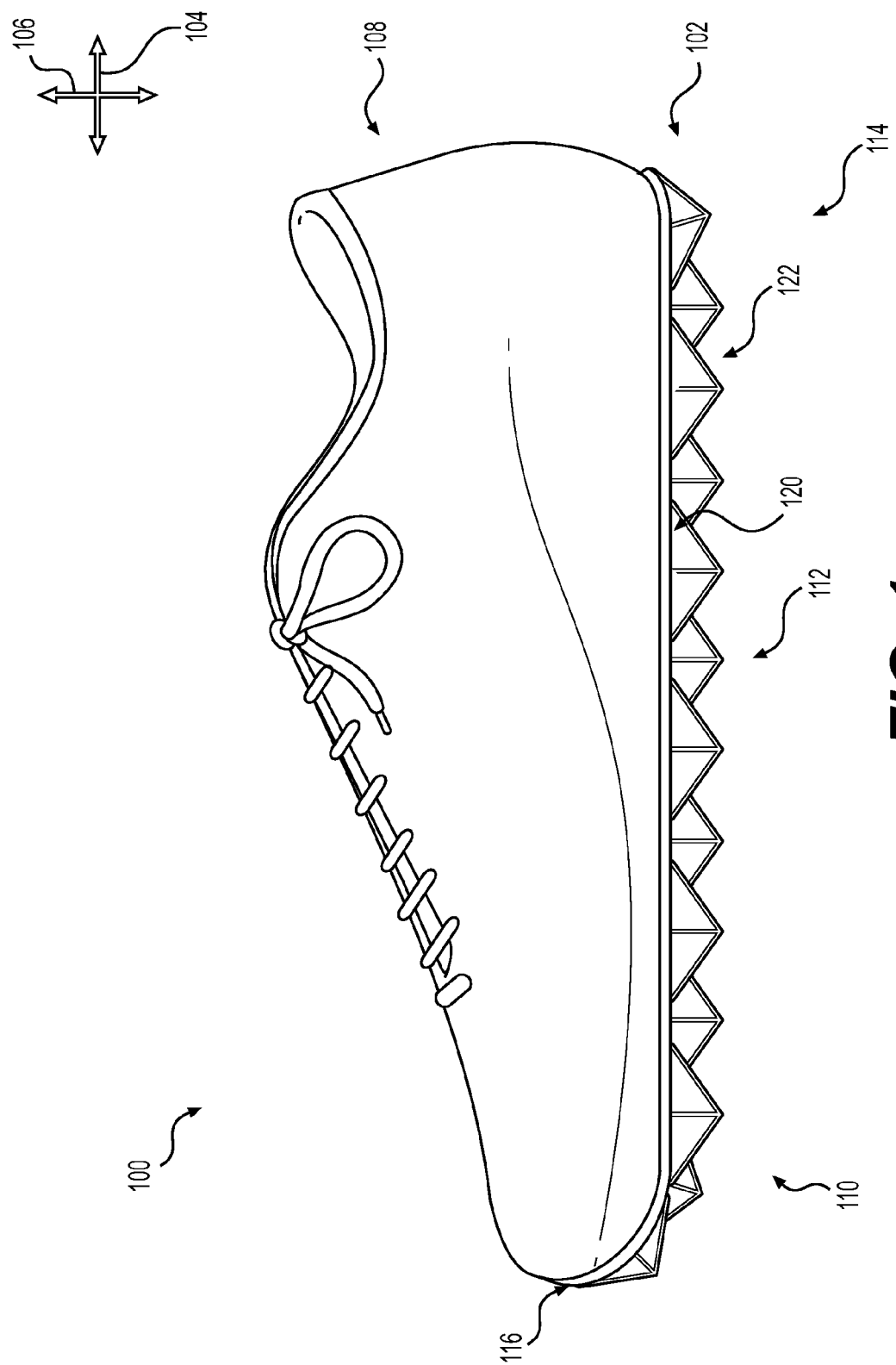
FIG. 1 is a side view of an embodiment of an article of footwear having a sole structure with ground engaging members.

The following discussion and accompanying figures disclose a sole structure for an article of footwear. Concepts associated with the footwear disclosed herein may be applied to a variety of athletic footwear types, including soccer shoes, baseball shoes, football shoes, and golf shoes, for example. Accordingly, the concepts disclosed herein apply to a wide variety of footwear types.

For consistency and convenience, directional adjectives are employed throughout this detailed description corresponding to the illustrated embodiments. The term "longitudinal," as used throughout this detailed description and in the claims, refers to a direction extending a length of a sole structure, i.e., extending from a forefoot portion to a heel portion of the sole. The term "longitudinal axis," as used throughout this detailed description and in the claims, refers to an axis oriented in a longitudinal direction.

The term "forward" is used to refer to the general direction in which the toes of a foot point, and the term "rearward" is used to refer to the opposite direction, i.e., the direction in which the heel of the foot is facing.

The term "lateral direction," as used throughout this detailed description and in the claims, refers to a side-to-side direction extending a width of a sole. In other words, the lateral direction may extend between a medial side and a lateral side of an article of footwear, with the lateral side of the article of footwear being the surface that faces away from the other foot, and the medial side being the surface that faces toward the other foot. The term "lateral axis," as used throughout this detailed description and in the claims, refers to an axis oriented in a lateral direction.

The term "horizontal," as used throughout this detailed description and in the claims, refers to any direction substantially parallel with the longitudinal direction, the lateral direction, and all directions in between. In cases where an article is planted on the ground, a horizontal direction may be parallel with the ground. Similarly, the term "side," as used in this specification and in the claims, refers to any portion of a component facing generally in a lateral, medial, forward, and/or rearward direction, as opposed to an upward or downward direction.

The term "vertical," as used throughout this detailed description and in the claims, refers to a direction generally perpendicular to both the lateral and longitudinal directions, along a vertical axis. For example, in cases where a sole is planted flat on a ground surface, the vertical direction may extend from the ground surface upward. It will be understood that each of these directional adjectives may be applied to individual components of a sole. Furthermore, the term "outer surface," or "outer side" as used throughout this detailed description and in the claims, refers to the surface of a component that would be facing away from the foot when worn by a wearer. "Inner surface," or "inner side" as used throughout this detailed description and in the claims, refers to the surface of a component that is facing inward, or the surface that faces toward the foot when worn by a wearer.

For purposes of this disclosure, the foregoing directional terms, when used in reference to an article of footwear, shall refer to the article of footwear when sitting in an upright position, with the sole facing groundward, that is, as it would be positioned when worn by a wearer standing on a substantially level surface.

In addition, for purposes of this disclosure, the term "permanently attached" shall refer to two components joined in a manner such that the components may not be readily separated (for example, without destroying one or both of the components). Exemplary modalities of fixed or permanent attachment may include joining with permanent adhesive, rivets, stitches, nails, staples, welding or other thermal bonding, and/or other joining techniques. In addition, two components may be permanently attached by virtue of being integrally formed, for example, in a molding process.

FIG. 1 depicts a side-view of one embodiment of an article of footwear ("article") 100, which may include a sole structure 102 and an upper 108 configured to receive a foot. Sole structure 102 may be permanently attached to a bottom portion of upper 108. As shown in FIG. 1 for reference purposes, article 100 may be divided into three general regions, including a forefoot region 110, a midfoot region 112, and a heel region 114. Forefoot region 110 generally includes portions of article 100 corresponding with the toes and the joints connecting the metatarsals with the phalanges. Midfoot region 112 generally includes portions of article 100 corresponding with an arch area of the foot. Heel region 114 generally corresponds with rear portions of the foot, including the calcaneus bone. Forefoot region 110, midfoot region 112, and heel region 114 are not intended to demarcate precise areas of article 100. Rather, forefoot region 110, midfoot region 112, and heel region 114 are intended to represent general relative areas of article 100 to aid in the following discussion.

The accompanying figures depict various embodiments of article 100, having sole structures 102 suited for multi-directional traction on natural and/or synthetic turf. Article 100, as depicted, may be suited for a variety of activities on natural and/or synthetic turf, such as agility/speed training and competition, as well as other sports, such as baseball, soccer, American football, and other such activities where traction and grip may be significantly enhanced by cleat members. In addition, various features of the disclosed sole structures 102 (and/or variations of such features) may be implemented in a variety of other types of footwear.

As sole structure 102 and upper 108 both span substantially the entire length of article 100 along a longitudinal direction 104, the terms forefoot region 110, midfoot region 112, and heel region 114 apply not only to article 100 in general, but also to sole structure 102 and upper 108, as well as the individual elements of sole structure 102 and upper 108.

In different embodiments, upper 108 may include one or more material elements (for example, textiles, foam, leather, and synthetic leather), which may be stitched, adhesively bonded, molded, or otherwise formed to define an interior void configured to receive a foot. The material elements may be selected and arranged to selectively impart properties such as durability, air-permeability, wear-resistance, flexibility, and comfort. Upper 108 may alternatively implement any of a variety of other configurations, materials, and/or closure mechanisms.

In different embodiments, sole structure 102 may have a configuration that extends between a bottom surface of upper 108 and the ground in a vertical direction 106 and may be secured to upper 108 in any suitable manner. For example, sole structure 102 may be secured to upper 108 by adhesive attachment, stitching, welding, or any other suitable method. Sole structure 102 may include provisions for attenuating ground reaction forces (that is, cushioning and stabilizing the foot during vertical and horizontal loading) in some embodiments. In addition, sole structure 102 may be configured to provide traction, impart stability, and/or limit various foot motions, such as pronation, supination, and/or other motions.

In different embodiments, the configuration of sole structure 102 may vary significantly according to one or more types of ground surfaces on which sole structure 102 may be used. For example, the disclosed concepts may be applicable to footwear configured for use on indoor surfaces and/or outdoor surfaces. The configuration of sole structure 102 may vary based on the properties and conditions of the surfaces on which article 100 is anticipated to be used. For example, sole structure 102 may vary depending on whether the surface is harder or softer. In addition, sole structure 102 may be tailored for use in wet or dry conditions.

Sole structure 102 may include multiple components in some embodiments, which may individually and/or collectively provide article 100 with a number of attributes, such as support, rigidity, flexibility, stability, cushioning, comfort, reduced weight, traction, and/or other attributes. For example, in some embodiments, sole structure 102 may incorporate incompressible plates, moderators, and/or other elements that attenuate forces, influence the motions of the foot, and/or impart stability, for example. Further, while various types of cleated article 100 may be provided without a midsole, in some embodiments, sole structure 102 may also include a midsole (not shown) or another sole layer disposed between an outer member 116 and upper 108. In some embodiments, an additional sole layer disposed between outer member 116 and upper 108 may include cushioning members, reinforcing structures, support structures, or other features. In another embodiment, a midsole may include a recess to hold outer member 116. In other embodiments, a midsole may not be included in sole structure 102 and/or outer member 116 may be joined directly to upper 108.

Figure 2:
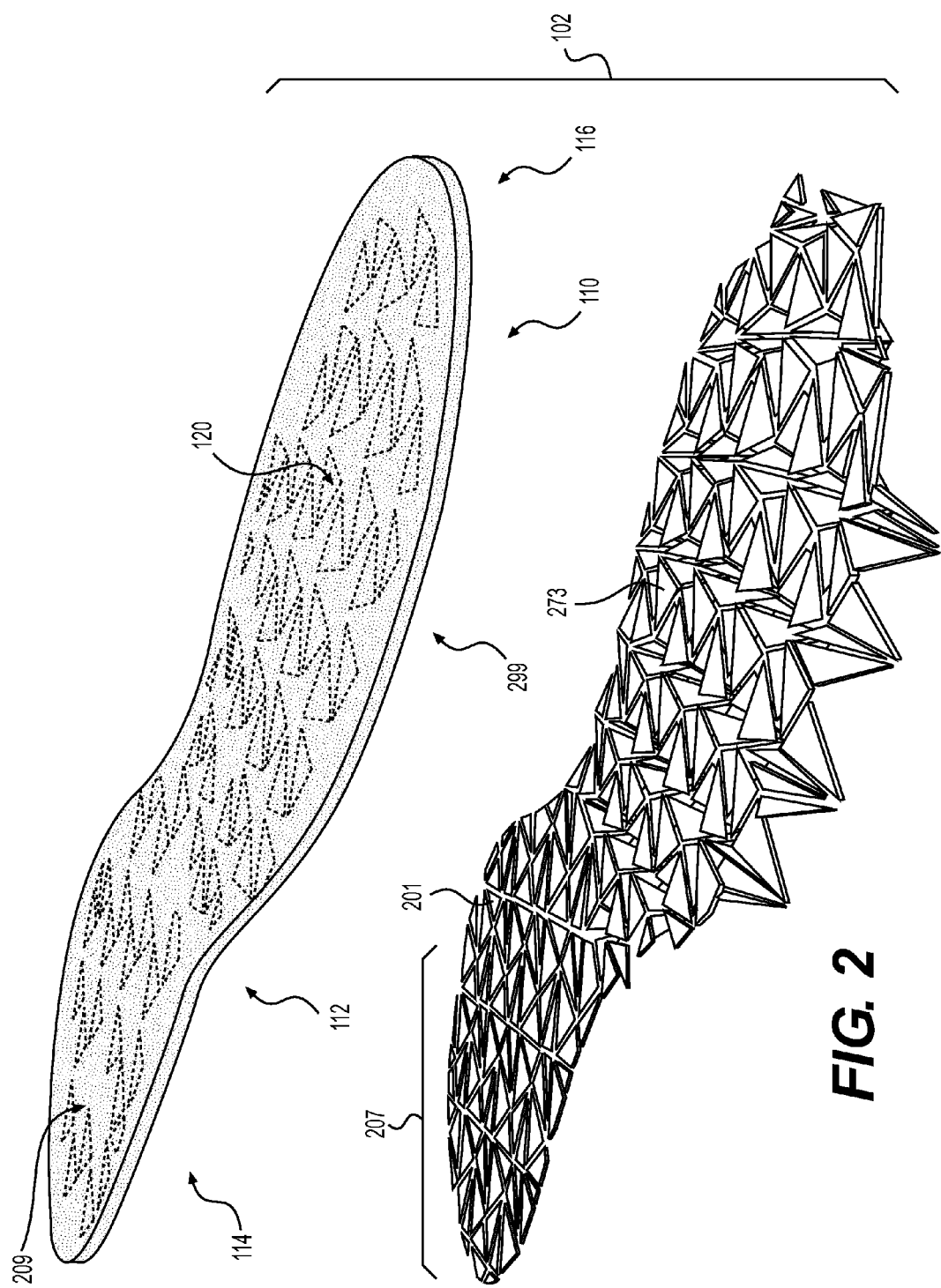
FIG. 2 is an exploded view of an embodiment of a sole structure for an article of footwear

As shown in the FIGS. 1 and 2, sole structure 102 according to the present disclosure may include outer member 116. In different embodiments, outer member 116 may include a substantially two-dimensional or base-like element that provides supports to the foot. In some embodiments, outer member 116 may include various anatomical contours. For example, the inner surface of outer member 116 associated with forefoot region 110 can be curved higher than an area associated with midfoot region 112, or there may be a higher arch support region, and other features related to the anatomy of a foot. In other embodiments, outer member 116 may be a flexible or otherwise substantially elastic material, as discussed further below.

In some embodiments, sole structure 102 may include ground engaging members 122. Ground engaging members 122 may be cleats or structures substantially similar to cleats. In other embodiments, ground engaging members 122 may be convex portions, or convex members. In some embodiments, ground engaging members 122 may vary in height from one another. In another embodiment, as shown in FIG. 1, ground engaging members 122 may have substantially similar heights throughout outer member 116. Embodiments of ground engaging members 122 may have one or more features that provide increased traction, directional traction, ground penetration, and/or ground extraction. Such features may include, for example, shapes, sizes, positioning on outer member 116, as well as the orientation of ground engaging members 122. Embodiments of such structures are discussed in greater detail below.

Embodiments of ground engaging members 122 may have one or more features that provide increased traction, directional traction, ground penetration, and/or ground extraction. Such features may include, for example, shapes, sizes, positioning along outer member 116, as well as the orientation and arrangement of ground engaging members 122.

In the embodiment of FIG. 2, an exploded view of sole structure 102 is depicted. Outer member 116 is shown, including an inner surface 209 and an outer surface 299. In different embodiments, inner surface 209 may be joined or attached to the bottom portion of upper 108. In some embodiments, outer surface 299 can serve as a platform or base along which one or more additional elements may be joined. In some embodiments, one or more ground engaging members 122 may be formed by selective attachment of portions of material to outer member 116. As an example, in FIG. 2, various pieces of material comprising base segments 207 are illustrated prior to their attachment to outer surface 299 of outer member 116. In some embodiments, one or more base segments 207 can be associated with a different durometer or hardness than outer member 116.

Thus, in different embodiments, outer member 116 may be combined or otherwise attached to elements that provide traction and stability on any of a variety of surfaces, and in any of a variety of conditions. In some embodiments, base segments 207 can comprise a series of faces 201 and panels 273 that are attached to or otherwise joined to outer surface 299 of outer member 116. In other words, base segments 207 can be distinct and separate pieces that are joined, attached or otherwise disposed along outer surface 299 of outer member 116. In one embodiment, base segments 207 may be permanently attached to outer surface 299 of outer member 116. In other embodiments, base segments 207 may be attached in non-permanent manner.

In some embodiments, faces 201 may be disposed along outer member 116 in an arrangement that allows the formation of ground engaging members 122. In one embodiment, one or more faces 201 may be disposed adjacent to one another to form regions of sole structure 102 that are associated with ground engaging members 122. In some embodiments, ground engaging members 122 comprising faces 201 can be disposed along outer surface 299 and may be surrounded or otherwise located so that they are adjacent to or near panels 273. For purposes of this description, the areas of outer member 116 that include or are otherwise joined to panels 273 may be referred to as base portions 120 of outer member 116. As shown in FIGS. 1 and 2, in some embodiments, ground engaging members 122 may be arranged along outer surface 299 of outer member 116 so that ground engaging members 122 are adjacent to at least one base portion 120. In another embodiment, ground engaging members 122 may be arranged along outer surface 299 of outer member 116 in such a way that substantially all ground engaging members 122 are surrounded by base portions 120. In some embodiments, ground engaging members 122 may extend from one or more base portions 120.

Base portion 120 of outer member 116, which may be associated with panels 273, may be approximately arranged in a plane of sole structure 102 (i.e., a plane that extends approximately in the longitudinal and lateral directions of sole structure 102, but which does not extend substantially in the vertical direction). In contrast, ground engaging members 122, which may be comprised of portions of outer member 116 as well as faces 201, may extend substantially into the vertical direction during some configurations of sole structure 102. As discussed in further detail below, in some configurations of sole structure 102, ground engaging members 122 may flatten out and extend almost entirely within the same plane as base portion 120. For purposes of illustration, base portion 120 is indicated schematically on outer member 116 using dotted lines.

Materials comprising faces 201 and panels 273 may be associated with a substantially similar hardness, or they may have different hardness. For purposes of this description, it should be understood that ground engaging members 122 refer to the distinct portions or regions of sole structure 102 that include the arrangement of one or more faces 201 along outer member 116. Ground engaging members 122 may in one embodiment be at least partially surrounded by panels 273.

Figure 3:
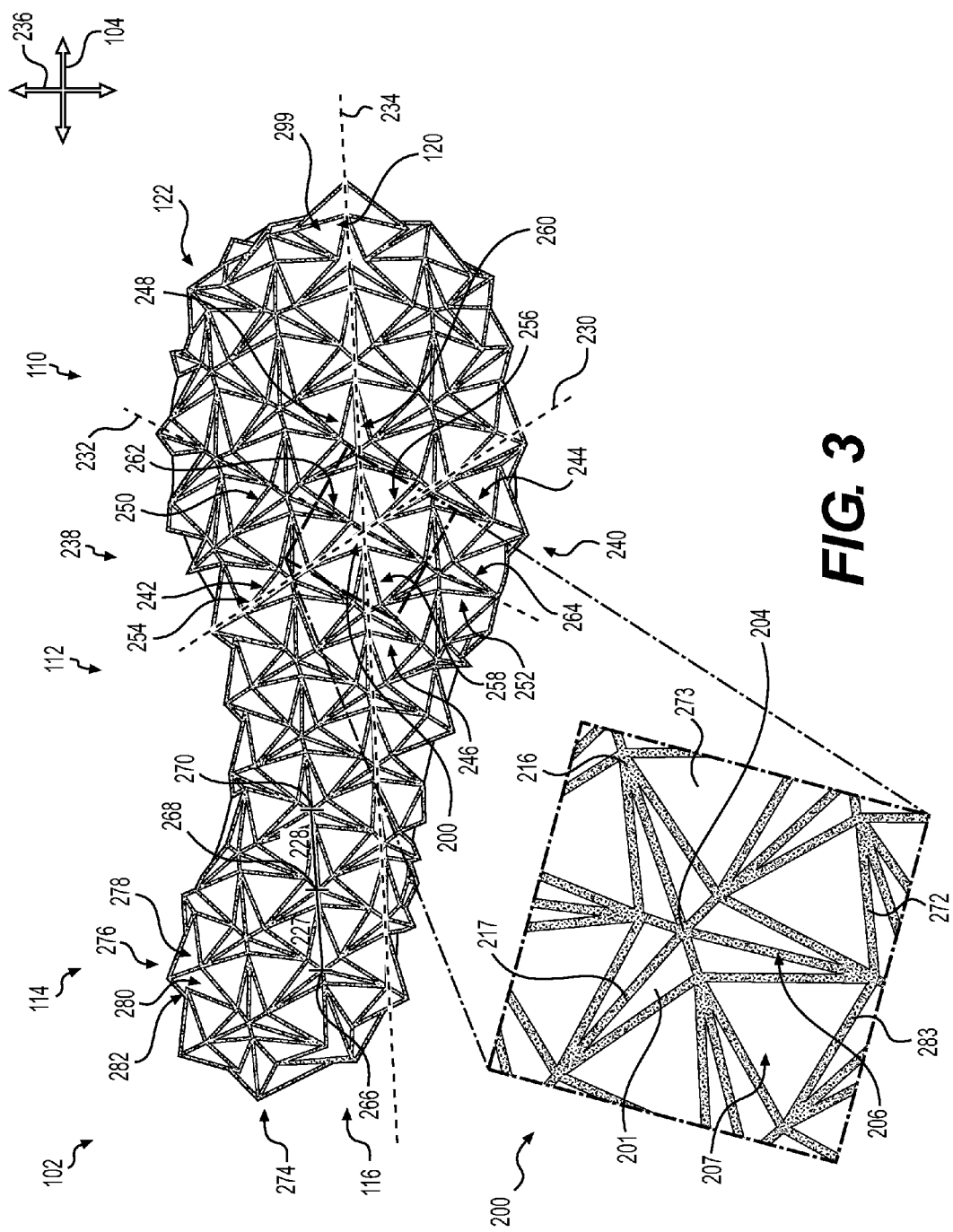
FIG. 3 is an illustration of the outer surface of an embodiment of a sole structure for an article of footwear.

FIG. 3 is a bottom view of outer surface 299 of an assembled embodiment of sole structure 102. In other words, FIG. 3 depicts the bottom of sole structure 102, comprising outer member 116, ground engaging members 122 with faces 201, and panels 273. An enlarged view of a first ground engaging member 200 is included for purposes of illustration and will be further discussed in relation to FIG. 4.

In the embodiment shown in FIG. 3, ground engaging members 122 and other portions of sole structure 102 may be configured in a geometric pattern that provides an auxetic structure to at least some portions of sole structure 102. As will be described in greater detail with respect to FIGS. 2-20, sole structure 102 may include an auxetic structure that, when placed under tension in a first direction, can increase in size both in the first direction and in the direction in the plane of the structure that is orthogonal to the first direction. In some embodiments, outer member 116 may be at least partially an auxetic structure. A structure that deforms due to its auxetic properties may be said to undergo an auxetic action.

As used herein, the terms "auxetic" generally refers to materials that have a negative Poisson's ratio, such that when they are under tension in a first direction, their dimensions increase both in the first direction and in a direction orthogonal the first direction. Articles of footwear having soles with an auxetic structure are described in Cross, U.S. patent application Ser. No. 14/030,002, filed Sep. 18, 2013 and titled "Auxetic Structures and Footwear with Soles Having Auxetic Structures", which is incorporated by reference above. In some cases, the term "reactive structure" may also be used to describe an auxetic structure.

For example, if the structure can be described as having a length, a width and a thickness, then when the structure is under tension longitudinally, the structure increases in width. In some embodiments, the auxetic structures are bi-directionally auxetic such that they increase in length and width when stretched longitudinally and in width and length when stretched laterally, but do not increase in thickness. Also, although such auxetic structures will generally have at least a monotonic relationship between the applied tension and the increase in the dimension orthogonal to the direction of the tension, that relationship need not be proportional or linear, and in general need only increase in response to increased tension. Thus, in one embodiment, sole structure 102 can expand in a first direction and a second direction when sole structure 102 is tensioned in the first direction, where the second direction is substantially perpendicular to the first direction.

In different embodiments, ground engaging members 122 may be used to form auxetic structures along outer member 116. In some embodiments, ground engaging members 122 may comprise portions that can project outwardly from the base of a sole structure. In different embodiments, portions may be any shape, size, or geometry. In some embodiments, various polygonal features or portions may be used to form the auxetic structures, such as triangular, quadrilateral, pentagonal, hexagonal, heptagonal or octagonal features. In other embodiments, portions may be polygonal features used to form three-pointed star-shaped projections, four-pointed star-shaped projections, five-pointed star-shaped projections, or six-pointed star-shaped projections. In the embodiment of FIG. 3, the portions are depicted as ground engaging members 122 that include generally triangular features forming three-pointed star-shaped pyramidal structures or projections. In one embodiment, ground engaging members may have the approximate geometry of a pyramid with a tri-star base. For example, in some embodiments, sole structure 102 or portions of soles structure 102 may incorporate any of the structures disclosed in Nordstrom, U.S. Patent Publication Number 2014/0053311, published Feb. 27, 2014 (now U.S. patent application Ser. No. 14/011,201, filed Aug. 27, 2013) and titled "Dynamic Materials Integrated Into Articles for Adjustable Physical Dimensional Characteristics," which is incorporated by reference in its entirety herein.

Thus, in different embodiments, ground engaging members 122 may be configured in varying geometric patterns. In some embodiments, ground engaging members 122 may include convex features. In other embodiments, ground engaging members 122 may include various hinges or predetermined regions of bending, as will be discussed further below. In one embodiment, when ground engaging members 122 are vertically compressed they can unfold and extend in a horizontal direction. In some embodiments, ground engaging members 122 may be compressed so that they substantially flatten out and expand in the horizontal direction.

In some embodiments, there may be multiple ground engaging members 122 arranged on sole structure 102, and in one embodiment, ground engaging members 122 may function together to provide auxetic structure to outer member 116. For example, in one embodiment, as shown with respect to first ground engaging member 200 in FIGS. 3 and 4, one or more of ground engaging members 122 may have a substantially three-pointed star cross-sectional shape in a substantially horizontal plane. In some embodiments, one or more ground engaging members 122 may have a substantially three-pointed star cross-sectional shape over substantially the entire height of ground engaging member 122. Accordingly, first ground engaging member 200 may extend downward from outer member 116 in a substantially three-pointed star shape to an apex 204 of first ground engaging member 200. Apex 204 may represent the point on first ground engaging member 200 farthest from outer member 116.

In different embodiments, ground engaging members 122 may include one or more arm portions 206. In some embodiments, arm portions 206 may extend substantially radially from apex 204, and be disposed near or around a central region 208, as shown with respect to first ground engaging member 200. In some embodiments, one or more arm portions 206 may extend in a substantially non-radial direction from central region 208. In other embodiments, all arm portions 206 of a single ground engaging member may extend radially from central region 208 of the ground engaging member.

Figure 4:
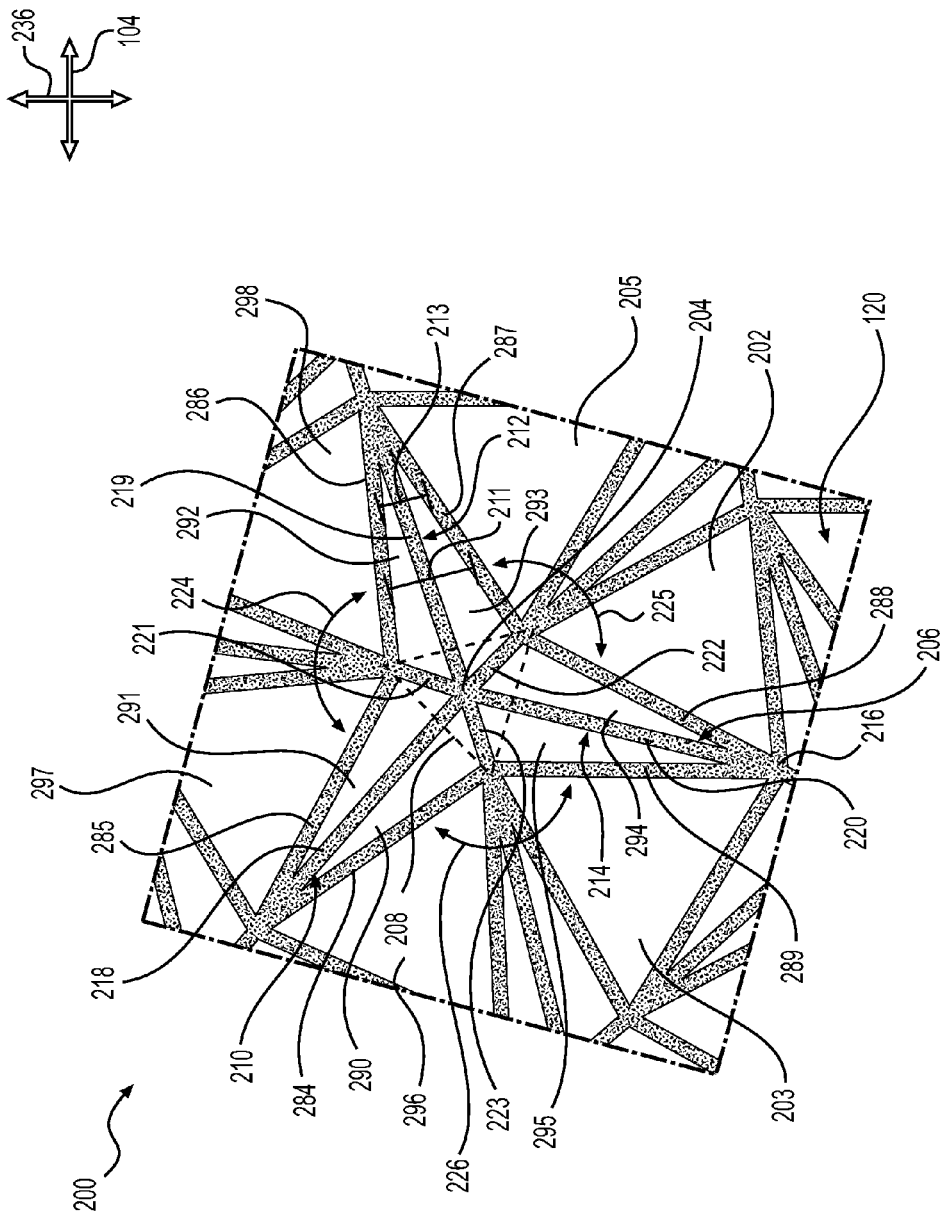
FIG. 4 is a magnified illustration of an embodiment of a portion of a sole structure for an article of footwear.

In some embodiments, central region 208 may be different shapes. In the embodiment of FIGS. 3 and 4, central region 208 includes a triangular shape in the horizontal plane. In other embodiments, central region 208 may include a circular, square, or other polygonal shape. Central region 208 is not intended to demarcate a precise area of ground engaging member. Rather, it is intended to represent a general relative area of the ground engaging member to aid in the following discussion.

In some embodiments, a majority of ground engaging members 122 may each include three arm portions 206, extending outward in a radial direction. For example, in FIG. 4, first ground engaging member 200 shown in the enlarged view includes a first arm portion 210, a second arm portion 212, and a third arm portion 214. Each arm portion begins near central region 208 and terminates at a vertex 216. In FIG. 3, a midline 217 on each arm portion may be seen that extends from apex 204 to each vertex 216.

In different embodiments, arm portions 206 may have various shapes. In some embodiments, arm portions 206 may include a generally triangular shape. In other embodiments, vertices 216 may include an edge that is more pointed, or less pointed, than that depicted in FIGS. 3 and 4. In other words, edge of vertex 216 may be more rounded or curved, or may be more narrow or sharp. Furthermore, arm portions 206 may be non-linear in some embodiments. For example, in some embodiments, arm portions 206 may extend outward from central region 208 and include a curved geometry. In different embodiments, first arm portion 210, second arm portion 212, and third arm portion 214 of first ground engaging member 200 may be shaped similarly to one another, or they may each have different shapes.

In different embodiments, the width of arm portions 206 in the horizontal plane may vary from central region 208 to vertex 216. In some embodiments, there can be a first width 211 that is closer to central region 208, and a second width 213 that is closer to vertex 216. In some embodiments, first width 211 is larger than second width 213. In other embodiments, first width 211 may be substantially equivalent to second width 213, or may be smaller.

As described earlier, in different embodiments, outer member 116 may include panels 273. Panels 273 may be attached, joined, glued, or otherwise disposed adjacent to outer member 116. In some embodiments, there may be one or more panels 273 disposed around each ground engaging member 122. For example, referring to the enlarged view of first ground engaging member 200, there are six panels arranged around first ground engaging member 200, including a first panel 296, a second panel 297, a third panel 298, a fourth panel 205, a fifth panel 202, and a sixth panel 203.

In some embodiments, panels 273 may be substantially similar in shape to the portions of ground engaging member 122 comprising faces 201. In other embodiments, panels 273 may be a different shape than the shape of faces 201 or the area defined by adjacent arm portions 206.

In different embodiments, there may be regions or portions of outer member 116 where no base segments 207 are attached in assembled sole structure 102. For purposes of this description, these areas will be referred to as base areas 272. Base areas 272 may be exposed regions of outer surface 299 of outer member 116. In other words, in some cases, a border of outer member material may be disposed around base segments 207. This "border" of outer member material may surround base segments 207. Thus, in some embodiments, the geometry of individual faces 201 and panels 273 can generally demarcate base portion 120 of outer member 116 into smaller areas that remain exposed, or unattached to any base segments 207. As seen in FIGS. 3 and 4, outer member 116 includes a regular pattern of base areas 272 that lie between or adjacent to base segments 207.

In some embodiments, base areas 272 may generally include a relatively thin strip of outer member material. In other embodiments, outer member 116 may be demarcated in a different arrangement or geometrical pattern and provide base areas 272 of different shape or size. In some embodiments, base areas 272 may be curved or otherwise irregular, rather than linearly shaped. In other embodiments, the appearance of base areas 272 may be related to the shape, size, and arrangement of ground engaging members 122 included.

In some embodiments, different areas of outer member 116 may function as a hinge, permitting the turning, bending, rotation, or movement of various parts. In particular, in some embodiments, the edges or base areas 272 connecting adjacent portions or components of sole structure 102 may provide a hinge portion 283. In some embodiments, hinge portions 283 may be comprised of base areas 272. In one embodiment, hinge portions 283 can be associated with the various base areas 272 that remain exposed in base portion 120. In other words, in one embodiment, hinge portions 283 may include the relatively narrow areas of outer member material that "border" base segments 207 that have been joined to outer member 116. For purposes of this description, hinge portions 283 may be defined as base areas 272 located around base segments 207 that can provide flexibility and rotational motion to portions of sole structure 102.

In different embodiments, base segments 207 may be disposed on outer surface 299 of outer member 116 such that one or more hinge portions 283 are located below and around substantially each base segment 207. For example, one or more arm portions 206 of ground engaging members 122 may be disposed adjacent to hinge portions 283. In another embodiment, one or more panels 273 may be bordered by hinge portions 283. Hinge portions 283 may at least in part provide sole structure 102 with the auxetic properties described in this description. Base segments 207 may move or rotate about hinge portions 283 in some embodiments.

As one example, each face 201 of ground engaging member 200 may be associated with a corresponding hinge portion 283, which joins adjacent faces 201 in a rotatable manner. In FIGS. 3 and 4, it can be seen that ground engaging member 200 includes twelve hinge portions 283.

First arm portion 210 includes a first hinge portion 284 and a second hinge portion 285. Second arm portion 212 includes a third hinge portion 286 and a fourth hinge portion 287. Third arm portion 214 includes a fifth hinge portion 288 and a sixth hinge portion 289. Furthermore, along midline 217 of first arm portion 210 there is a seventh hinge portion 218, along midline 217 of second arm portion 212 there is an eighth hinge portion 219, and along midline 217 of third arm portion 214 there is a ninth hinge portion 220.

In addition, disposed between one arm portion and a neighboring arm portion within the same ground engaging member, there may be a hinge portion. Thus, in one embodiment, ground engaging member 200 may also be associated with a tenth hinge portion 221, an eleventh hinge portion 222, and a twelfth hinge portion 223. In some embodiments, each arm portion 206 may be associated with five hinge portions 283. In other embodiments, an arm portion 206 may be associated with less than or greater than five hinge portions 283. Furthermore, in other embodiments, each ground engaging member 122 may be associated with less than or greater than twelve hinge portions 283. For example, in cases where there are more than six faces 201 in a ground engaging member, there may also be a greater number of hinge portions 283.

As described above, hinge portions 283 can be comprised of a relatively small portion of outer member 116 adjoining or connecting various faces 201, or sides, of the various polygonal or irregular portions forming ground engaging members 122. In some embodiments, hinge portions 283 may provide a connecting portion between ground engaging member 122 and a neighboring portion of outer member 116, such as base areas 272. In another embodiment, hinge portions 283 may function as a connecting portion between a ground engaging member 122 and panels 273. For example, in FIGS. 3 and 4, a first face 290 and a second face 291 forming two sides or portions of first arm portion 210 are depicted. First face 290 and second face 291 may be joined, rotated or bent with respect to one another along seventh hinge portion 218. First face 290 may also be joined, moved, rotated, or bent along first hinge portion 284 with respect to first panel 296, and second face 291 may be connected, moved, rotated, or bent along second hinge portion 285, with respect to second panel 297.

In a similar manner, a third face 292 and a fourth face 293 form two sides or portions of second arm portion 212. Third face 292 and fourth face 293 may join, rotate or bend with respect to one another along eighth hinge portion 219. Third face 292 may also be joined, move, rotate or bend along third hinge portion 286 with respect to third panel 298, and fourth face 293 may be connected, move, rotate, or bend along fourth hinge portion 287 with respect to fourth panel 205. In addition, third arm portion 214 may be comprised of two portions or sides, including a fifth face 294 and a sixth face 295. Fifth face 294 and sixth face 295 may join, rotate or bend with respect to one another at ninth hinge portion 220. Fifth face 294 may be connected, move, rotate, or bend along fifth hinge portion 288 with respect to fifth panel 202, and sixth face 295 may be joined, move, rotate, or bend along sixth hinge portion 289 with respect to sixth panel 203.

Furthermore, faces 201 disposed on neighboring arm portions may move relative to one another. For example, in one embodiment, second face 291 and third face 292 may be joined, rotated or bent with respect to one another along tenth hinge portion 221. In addition, in another embodiment, fourth face 293 and fifth face 294 may be joined, rotated or bent with respect to one another along eleventh hinge portion 222. In one embodiment, sixth face 295 and first face 290 may be joined, rotated or bent with respect to one another along twelfth hinge portion 223.

In some embodiments, the characteristics of hinge portions 283 may be related to the type of shape or geometry selected for ground engaging members 122. In other embodiments, ground engaging members 122 may not include hinge portions 283. In different embodiments, ground engaging members 122 may be comprised of one or more arm portions 206 joined along one or more hinge portions 283. Arm portions 206 may include one or more sides, or faces 201, which when joined together along hinge portions 283 may provide a high level of flexibility to sole structure 102. In one embodiment, arm portions 206 may include convex portions comprised of one or more faces 201.

In some embodiments, two adjacent arm portions 206 may form various angles. In the embodiment of FIG. 4, the three arm portions associated with first ground engaging member together form three angles, identified as an angle 224, an angle 225, and an angle 226. First arm portion 210, second arm portion 212, and third arm portion 214 are disposed so that each pair of adjacent arm portions form substantially equivalent obtuse angles. In other embodiments, the angles formed by a pair of adjacent arm portions may differ from one another. In some embodiments, any angles formed by a pair of neighboring arm portions may be acute or right angled. It should be noted that the magnitudes of angle 224, angle 225, and angle 226 may increase or decrease as the auxetic structure of sole structure 102 undergoes expansion or compression. In particular, as tenth hinge portion 221, eleventh hinge portion 222, and/or twelfth hinge portion 223 permit movement of various regions of first ground engaging member 200, corresponding angle 224, angle 225, and angle 226 can change.

In different embodiments, the orientation of one or more arm portions 206 may differ significantly or may be substantially similar. In the embodiment of FIGS. 3 and 4, first arm portion 210, second arm portion 212, and third arm portion 214 are oriented toward a different direction. In other words, each midline 217 of first arm portion 210, second arm portion 212, and third arm portion 214 is oriented along a different axis. In some embodiments, first arm portion 210 may be oriented along a first direction 230, second arm portion 212 may be oriented along a second direction 232, and third arm portion 214 may be oriented along a third direction 234. As seen in FIG. 3, first direction 230 and third direction 234 are oriented so that they extend diagonally relative to a lateral direction 236, from a medial side 238 to a lateral side 240 of sole structure 102. Second direction 232 is oriented so that it generally extends diagonally relative to longitudinal axis 104.

In different embodiments, the orientation of adjacent ground engaging members 122 may be vary or be substantially similar to the orientation of first ground engaging member 200. In other words, midlines 217 of other arm portions 206 of neighboring ground engaging members 122 may lie along or near substantially the same axis as the respective midlines 217 of the three arm portions of first ground engaging member 200 in some embodiments. For example, in FIG. 3, ground engaging members 122 adjacent to first ground engaging member 200 include second ground engaging member 242, third ground engaging member 244, fourth ground engaging member 246, fifth ground engaging member 248, sixth ground engaging member 250, and seventh ground engaging member 252. The midlines of a first arm portion 254 of second ground engaging member 242, first arm portion 210 of first ground engaging member 200, and a first arm portion 256 of third ground engaging member 244 may generally lie along first direction 230. The midlines of a second arm portion 258 of fourth ground engaging member 246, second arm portion 212 of first ground engaging member 200, and a second arm portion 260 of fifth ground engaging member 248 may generally lie along second direction 232. The midlines of a third arm portion 262 of sixth ground engaging member 250, third arm portion 214 of first ground engaging member 200, and a third arm portion 264 of seventh ground engaging member 252 may lie along third direction 234. In some embodiments, other ground engaging members 122 may include arm portions 206 that lie along axes that are substantially parallel to first direction 230, second direction 232, and third direction 234.

In other embodiments, ground engaging members 122 may be disposed along different orientations or arrangements. It should be noted that in different embodiments, first direction 230, second direction 232, third direction 234, and/or any other axis along which ground engaging members are arranged may be non-linear. In some embodiments, adjacent ground engaging members 122 may lie along an axis that is curved, for example. In other embodiments, ground engaging members 122 may be disposed in a staggered arrangement.

Providing all, or substantially all, of ground engaging members 122 so that an arm portion generally lies along first direction 230, second direction 232, or third direction 234, or along axes parallel to first direction 230, second direction 232, or third direction 234, may maximize the benefits discussed above regarding the characteristics of traction in medial side 238 to lateral side 240 (i.e., side-to-side) directions. Such configurations may provide increased performance in terms of traction supporting agility in lateral direction 236.

In different embodiments, two adjacent ground engaging members 122 may be disposed at various distances from one another. In some embodiments, ground engaging members 122 may be disposed at regular intervals from one another. In other embodiments, there may be greater space, or relatively larger base areas 272, between one ground engaging member and another ground engaging member. In the embodiment of FIG. 3, first ground engaging member 200 and sixth ground engaging member 250 are adjacent to one another so that third arm portion 262 of sixth ground engaging member 250 abuts area near central region 208 of first ground engaging member 200 within the obtuse angle formed by second arm portion 212 and third arm portion 214 of first ground engaging member 200. Other ground engaging members 122 may be disposed in a similar arrangement along areas of outer member 116. In one embodiment, ground engaging members 122 that generally lie along a single axis may be disposed so that they are at substantially the same distance from one another. For example, in FIG. 3, as exemplified by several cleats in heel region 114, a first distance 227 from a first apex 266 to a second apex 268 may be substantially similar to a second distance 228 from second apex 268 to a third apex 270. In other embodiments, first distance 227 may be less than second distance 228, or first distance 227 may be greater than second distance 228.

In some embodiments, particularly near a perimeter 274 of outer member 116, ground engaging members 122 may be partially formed. In other words, some ground engaging members 122 may be formed with fewer than three arm portions 206, arm portions 206 that extend for shorter lengths, and/or a central region 208 that is smaller relative to the central regions of other ground engaging members 122 disposed farther from perimeter 274. For example, in FIG. 3, an eighth ground engaging member 276 can be seen disposed along perimeter 274 of heel region 114. Eighth ground engaging member 276 includes a first arm portion 278 and a second arm portion 280, similar to arm portions 206 described above. However, a third arm portion 282 of eighth ground engaging member 276 is abbreviated relative to first arm portion 278 and second arm portion 280. Thus, in some embodiments, ground engaging members 122 may be formed along perimeter 274 of outer member 116 that differ from ground engaging members 122 that are not formed along perimeter 274. In some embodiments, at least one arm portion of each ground engaging member disposed along perimeter 274 may be shorter than arm portions 206 of the ground engaging members disposed further from perimeter 274. In other embodiments, there may be fewer than three arm portions included for one or more ground engaging members that are disposed along perimeter 274. In one embodiment, a ground engaging member near perimeter 274 may include only a single arm portion, or a partially formed arm portion.

Materials and configurations for sole structure 102 may be selected according to the type of activity for which article 100 is configured. Sole structure 102 and components comprising sole structure 102 such as ground engaging members 122, panels 273, and outer member 116, may be formed of one or more suitable materials for achieving the desired performance attributes. In different embodiments, for example, sole structure 102 components may be formed of any suitable polymer, rubber, composite, and/or metal alloy materials. Examples of such materials may include thermoplastic and thermoset polyurethane (TPU), polyester, nylon, glass-filled nylon, polyether block amide, alloys of polyurethane and acrylonitrile butadiene styrene, carbon fiber, poly-paraphenylene terephthalamide (para-aramid fibers, e.g., Kevlar®), titanium alloys, and/or aluminum alloys. In some embodiments, sole structure 102, or portions of sole structure 102 may be formed of a composite of two or more materials, such as carbon-fiber and poly-paraphenylene terephthalamide. In some embodiments, these materials may be disposed in different portions of sole structure 102. Alternatively, or additionally, carbon fibers and poly-paraphenylene terephthalamide fibers may be woven together in the same fabric, which may be laminated to form sole structure 102. Other suitable materials, including future-developed materials, will be recognized by those having skill in the art.

Different structural properties may be desired for different aspects of sole structure 102. Therefore, the structural configuration may be determined such that, even though a common material is used for all portions of outer member 116, for example, the different portions of sole structure 102 may be stiffer, or more flexible due to different shapes and sizes of the components such as base segments 207. In addition, different embodiments, for example, heel region 114 and midfoot region 112 of outer member 116, may be formed of a thicker material and/or may include reinforcing features, such as ribs, in order to provide stiffness to these portions of outer member 116, whereas forefoot region 110 of outer member 116, particularly a region of outer member 116 corresponding with the ball of the foot, may be formed of a relatively thin material, in order to provide flexibility to forefoot region 110. Greater flexibility in forefoot region 110 may enable natural flexion of the foot during running or walking, and may also enable outer member 116 to conform to surface irregularities, which may provide additional traction and stability on such surfaces.

In other embodiments, different portions of sole structure 102 may be formed of different materials. For example, a stiffer material, such as carbon fiber, may be utilized in heel region 114 and/or midfoot region 112 of outer member 116, whereas a more flexible material, such as a thin polyurethane, may be used to form forefoot region 110 of outer member 116. In addition, it may be desirable to utilize a stiffer and/or harder material for outer member 116 in some embodiments, such as carbon-fiber and/or polyurethane, and softer and more flexible material for ground engaging members 122, such as a relatively hard rubber. For example, some parts of outer member 116 may be made by molding a hard rubber or polyurethane to form the polygonal features.

In some embodiments, sole structure 102 may comprise a multi-durometer component. In some embodiments, for example, different materials may be utilized in the formation of outer member 116 and base segments 207. In some embodiments, outer member 116 may be formed of a material of a different durometer rating, or hardness, than the materials used to form base segments 207. In one embodiment, outer member 116 material can have a smaller durometer rating relative to the materials comprising base segments 207. In some embodiments, outer member 116 may be comprised of a relatively softer, elastic, flexible and/or bendable material compared to base segments 207. In one embodiment, outer member 116 may be made of a thin film, such as rubber, a soft polymer, nylon film, or other similar material. In one embodiment, the thin film comprising outer member 116 may be highly durable and low weight.

In some embodiments, at least one face 201 of ground engaging members 122 and at least one panel 273 may be made of substantially similar materials. In other embodiments, faces 201 of ground engaging members 122 and panels 273 may be made of different materials. In one embodiment, all base segments 207 in sole structure 102 may be comprised of substantially similar materials and have a substantially similar durometer rating. In some embodiments, base segments 207 may be formed with a thicker structure to provide additional rigidity and strength in some embodiments.

Sole structure 102 comprised of a dual-durometer material may allow movement of sole structure 102 at varying rates along hinge portions 283. For example, in some embodiments, the hardness of material comprising outer member 116 may be closer to the hardness of base segments 207, or greater than that of base segments 207, and so the flexibility of sole structure 102 may be diminished or the rate of bending may be slowed. In another embodiment, the hardness of the material comprising outer member 116 may be decreased so that the flexibility of sole structure 102 is enhanced. Thus, in different embodiments, outer member 116 can be highly flexible relative to base segments 207, which may be relatively more rigid. This type of structure 102 can provide both a relatively rigid support for the sole structure 102 through base segments 207, and also allow for flexibility between faces 201 and panels 273, which are joined along a relatively flexible layer formed of outer member 116, rather than being bound directly to one another.

In different embodiments, sole structure 102 may be formed by any suitable process. For example, in some embodiments, outer member 116 may be formed by molding. In addition, in some embodiments, various elements of sole structure 102 may be formed separately and then joined in a subsequent process. Those having ordinary skill in the art will recognize other suitable processes for making sole structure 102 discussed in this disclosure.

In some embodiments, outer member 116, base segments 207, and other elements of sole structure 102 may be integrally formed. In such embodiments, sole structure 102 may be formed all at once in a single molding process, for example, with injection molding. In one embodiment, base segments 207 may be formed together to create a framework. In some cases, base segments 207 may be connected, manufactured, or joined through sprues. The material of outer member 116 may then be dual injected or injection molded into the framework. The injection molding can provide a softer hinge area between the base segments 207, which may allow for the auxetic structure of sole structure 102. In addition, injection molding may allow the framework to be reinforced and supported. In another embodiment, a film comprising outer member 116 may be vacuum formed into the framework of base segments 207.

In other embodiments, sole structure 102 may be formed by multiple molding steps, for example, using a co-molding process. For instance, outer member 116 may be pre-molded, and then inserted into an outer member mold, into which the ground engaging member material may be injected to form base segments 207, or portions of base segments 207. In other embodiments, base segments 207 may be pre-molded and outer member 116 may be co-molded with the pre-formed base segments 207. In addition, other components of outer member 116, such as reinforcing elements, may be formed of different materials and joined to outer member 116 during manufacture.

In some embodiments, outer member 116 and base segments 207 may be made separately and then engaged with one another (e.g., by mechanical connectors, bonding materials, cements, pressure, adhesives, heat, etc.). In some embodiments, base segments 207 or other sole components may be integrally formed as a unitary, one piece construction (e.g., by a molding step). In some embodiments, at least some portions of sole structure 102 (e.g., outsole or outer member components) may be affixed to one another or formed together as a unitary, one-piece construction, e.g., by selective laser sintering, stereolithography, or other three dimensional printing or rapid manufacturing additive fabrication techniques. These types of additive fabrication techniques allow ground engaging members 122, outer member 116, panels 273, faces 201, and/or other components of sole structure 102 to be built as unitary structures.

Figure 5:
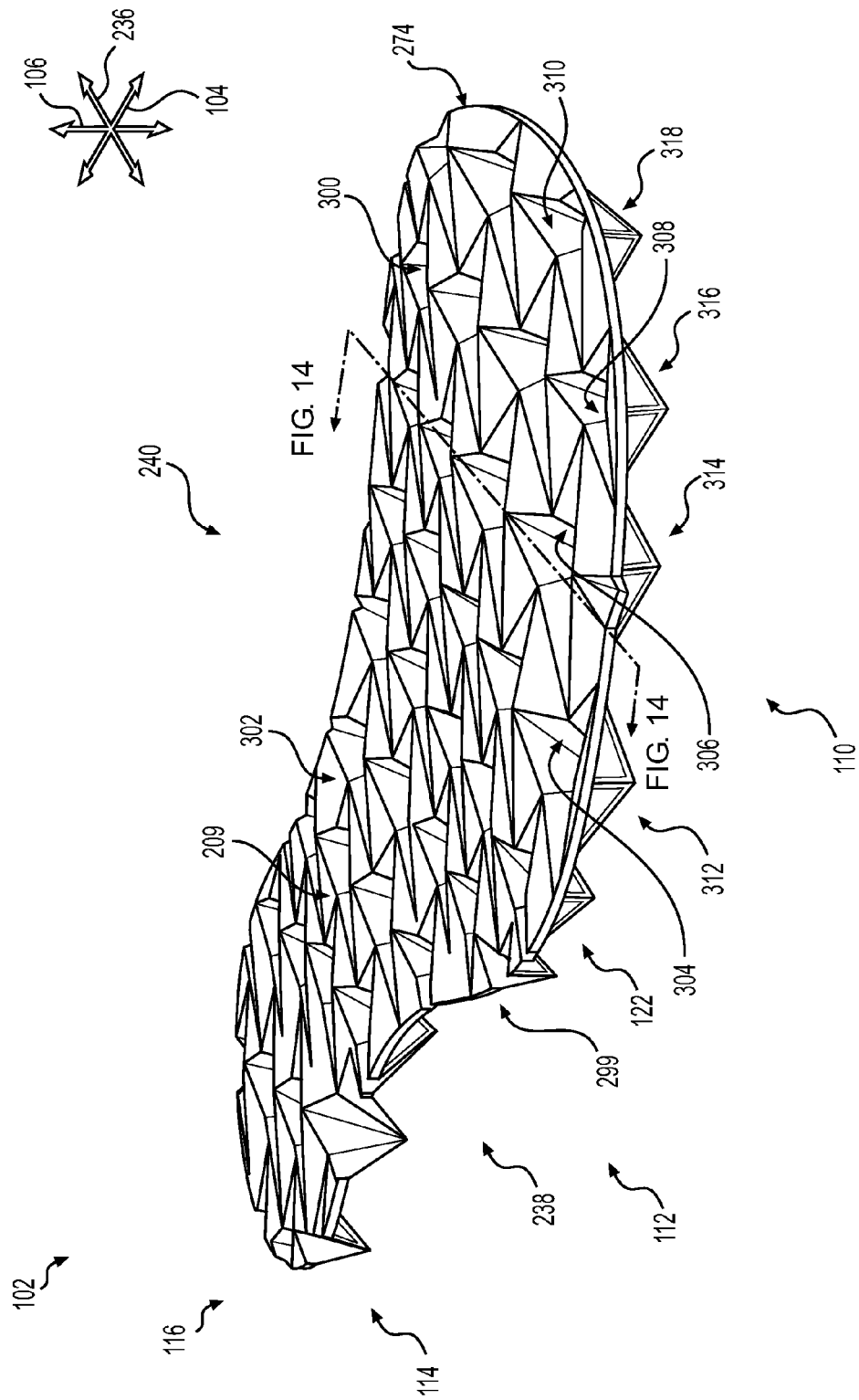
FIG. 5 is an isometric illustration of the inner surface of an embodiment of a sole structure for an article of footwear.

FIG. 5 illustrates an isometric view of inner surface 209 of an embodiment of outer member 116. Outer member 116 may include apertures 300 disposed along inner surface 209 of outer member 116 in some embodiments. In one embodiment, apertures 300 may comprise a hollow interior region that corresponds with ground engaging members 122 described with respect to outer side 299 of outer member 116. The hollow interior region can be associated with openings within inner surface 209 of outer member 116. In particular, apertures 300 may correspond to a concave interior side of ground engaging members 122. Apertures 300 may extend in vertical direction 106 through outer member 116.

In different embodiments, apertures 300 may be configured in varying geometric patterns. In some embodiments, apertures 300 may include concave features. In other embodiments, apertures 300 may include various hinges or predetermined regions of bending. In one embodiment, when apertures 300 are vertically compressed they can unfold and extend in a horizontal direction. In some embodiments, there may be multiple apertures 300 arranged on sole structure 102, and in one embodiment, apertures 300 may function together to provide auxetic structure to outer member 116.

In different embodiments, apertures 300 may be any shape, size, depth, or geometry. In some embodiments, various polygonal openings or other irregularly shaped openings may be used to form apertures 300, such as triangular, quadrilateral, pentagonal, hexagonal, heptagonal, octagonal, or other irregular features. In other embodiments, apertures 300 may be polygonal, and may form three-pointed star-shaped openings, four-pointed star-shaped openings, five-pointed star-shaped openings, or six-pointed star-shaped openings. In one embodiment, when corresponding ground engaging members 122 are vertically compressed, apertures 300 can decrease in size, unfold, flatten, and/or and extend in a horizontal direction.

In one example, as shown in FIG. 5, inner surface 209 of outer member 116 bears a pattern of triangular, or three-pointed, star-shaped apertures 300, bounded or surrounded at least in part by a pattern of inner base areas 302. In one embodiment, inner base areas 302 may be the opposing surface or side of base areas 272 that are attached to panels 273 on outer surface 299 of outer member 116, as described in FIGS. 3 and 4. It may be understood that inner base areas 302 on inner surface 209 may represent the opposing side of base areas 272 disposed on outer side 299 of outer member 116.

In different embodiments, inner base areas 302 may be configured in varying geometric patterns. In some embodiments, inner base areas 302 may include generally flat, sheet, or plate-like features. In other embodiments, inner base areas 302 may correspond to or include hinge portions 283, or other predetermined regions of bending for greater flexibility. In other embodiments inner base areas 302 may be relatively inflexible. In some embodiments, there may be multiple inner base areas 302 arranged on inner surface 209 of outer member 116. In one embodiment, inner base areas 302 may function together to help provide an auxetic structure to outer member 116. In some embodiments, the properties of inner base areas 302 and/or apertures 300 may be related to the material selected for outer member 116.

In some embodiments, inner base areas 302 may comprise variously shaped portions in outer member 116. In different embodiments, inner base areas 302 may be any shape, size, thickness, or geometry. In some embodiments, various polygonal shapes or other irregularly shape portions may comprise inner base areas 302, such as round, curved, elliptical, triangular, quadrilateral, pentagonal, hexagonal, heptagonal, octagonal, or other irregular features. In one embodiment, inner base areas 302 may be generally triangular. In some embodiments, inner base areas 302 may correspond in shape and/or size to base areas 272 discussed in reference to FIGS. 2-4.

In one case, inner base areas 302 may be separated by apertures 300 so that inner base areas 302 are completely enclosed and separated from one another. In other cases, inner base areas 302 are partially enclosed so that some inner base areas 302 can touch or abut adjacent inner base areas 302, as depicted in FIG. 5.

In different embodiments, apertures 300 may be disposed in various arrangements along outer member 116. In some embodiments, apertures 300 may be disposed in a uniform pattern along outer member 116. In other embodiments, apertures 300 may be disposed in only some areas of outer member 116.

In different embodiments, apertures 300 may align or correspond with ground engaging members 122 that are along outer side 299 of outer member 116. In other embodiments, ground engaging members 122 may be disposed on outer surface 299 of outer member 116, but the opposing side (inner surface 209) of outer member 116 may be solid, or "filled in," so that there is no corresponding aperture 300. In one embodiment, apertures 300 may be present but there may be no corresponding ground engaging member 122. In another embodiment, there may be ground engaging members 122 and corresponding apertures 300, but they may differ significantly in size or shape from one another. In the embodiment of FIG. 5, apertures 300 generally correspond to ground engaging members 122 disposed on the opposite side of outer member 116. As seen in forefoot region 110, and along perimeter 274 of outer member 116, there is a first aperture 304 which is aligned with a first ground engaging member 312, a second aperture 306 aligned with a second ground engaging member 314, a third aperture 308 aligned with a third ground engaging member 316, and a fourth aperture 310 aligned with a fourth ground engaging member 318. This type of arrangement may be repeated throughout outer member 116, or it may differ.

In some embodiments, the shape of apertures 300 in the horizontal plane may be substantially similar to the shape of corresponding ground engaging members 122 in the horizontal plane. In other embodiments, some areas of outer member 116 may include apertures 300 and ground engaging members 122 that are similar shapes, and other areas may include apertures 300 and ground engaging members 122 that are different shapes.

Figure 6:
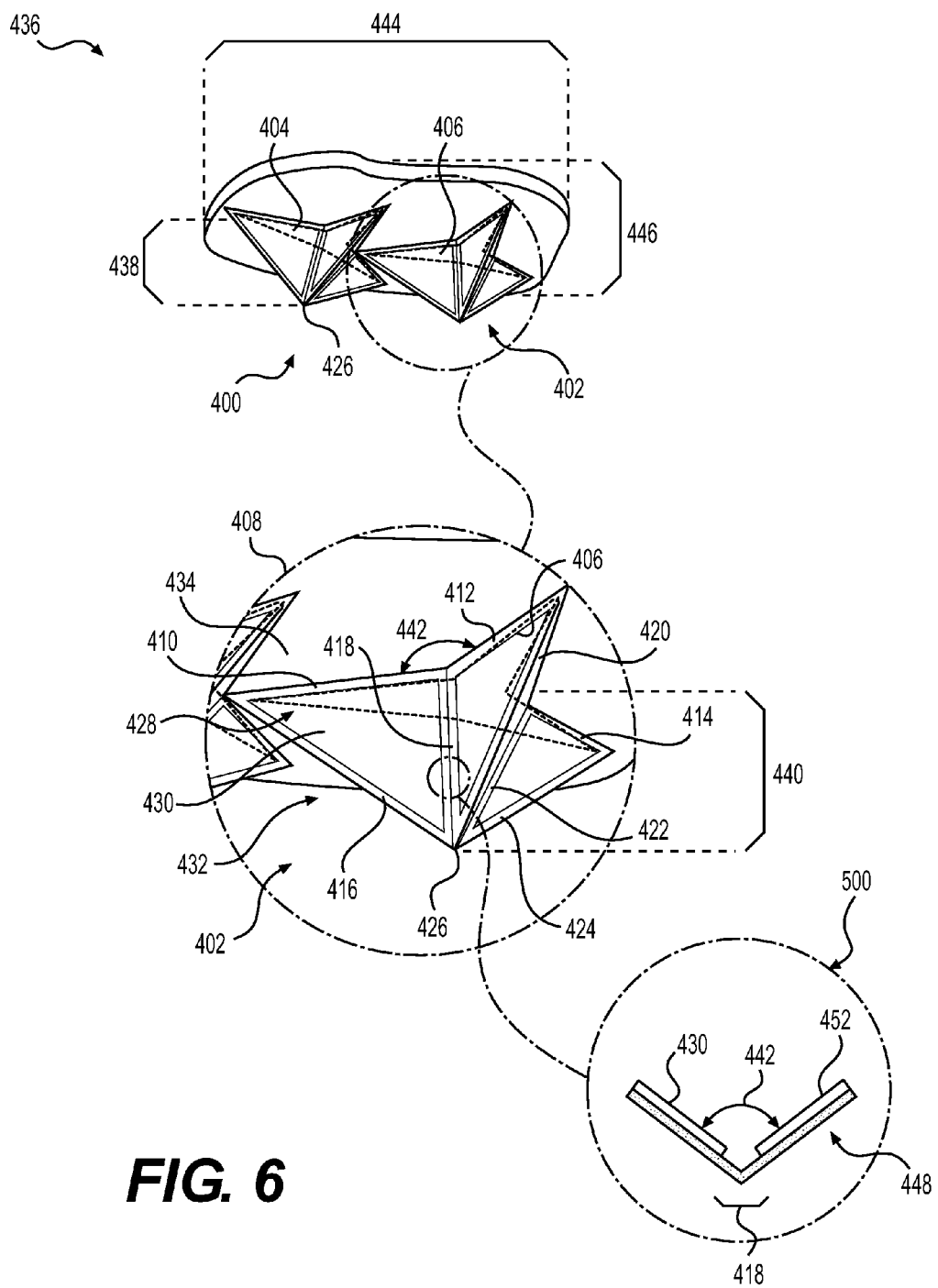
FIG. 6 is an isometric view of the outer surface of an embodiment of a portion of the sole structure.
Figure 7:
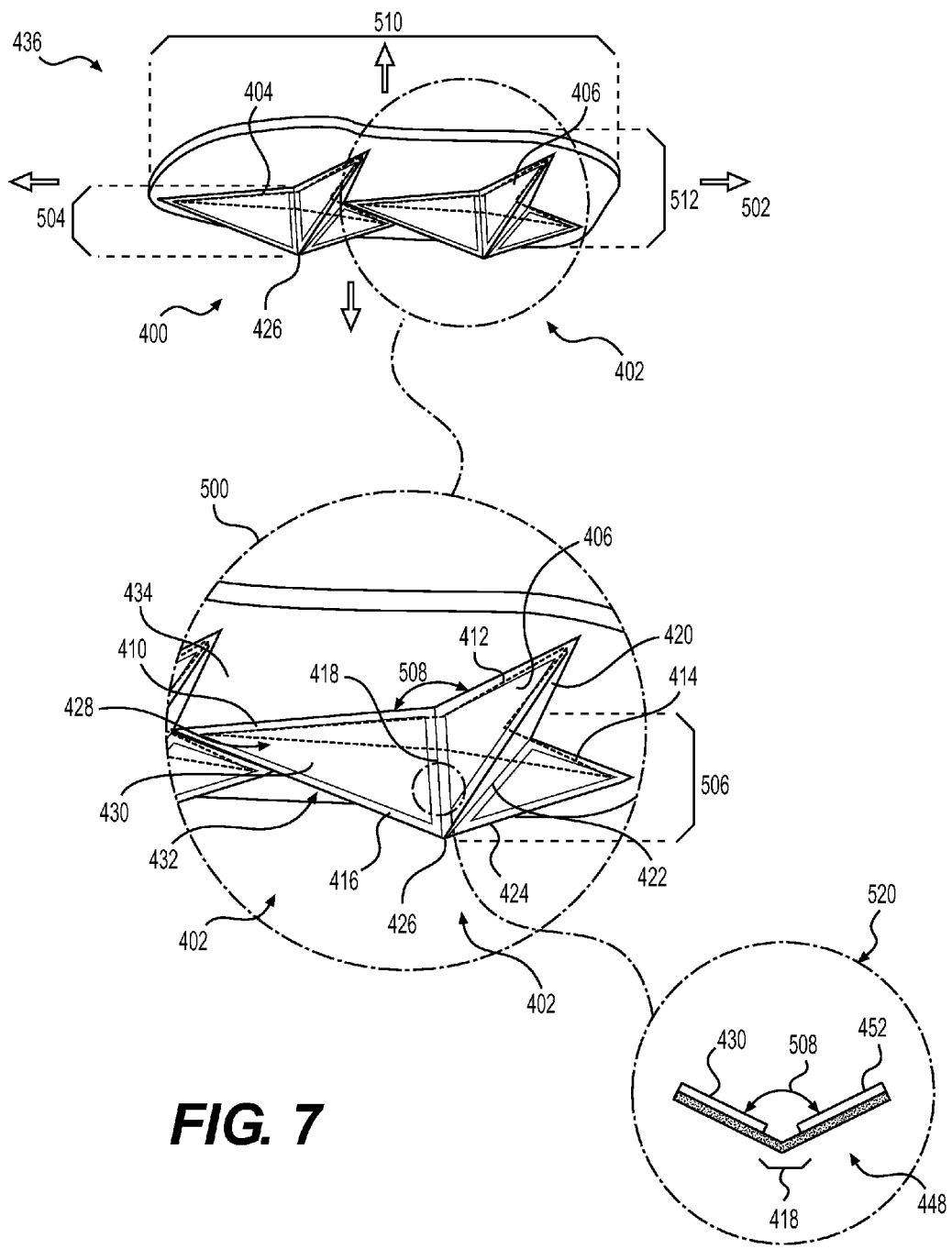
FIG. 7 is an isometric view of the outer surface of an embodiment of a portion of the sole structure.
Figure 8:
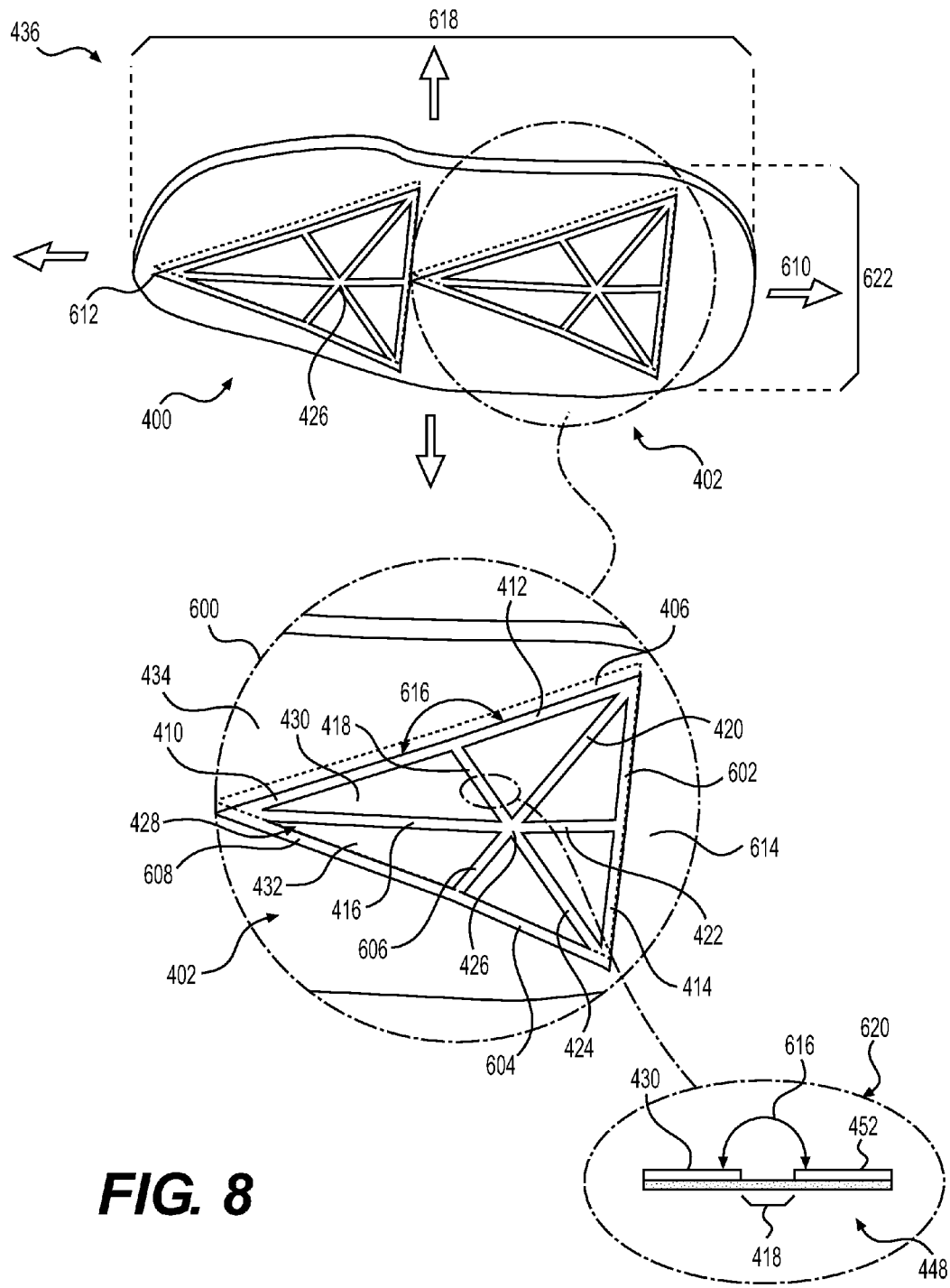
FIG. 8 is an isometric view of the outer surface of an embodiment of a portion of the sole structure.

During deformations as described above, ground engaging members 122 may expand or compress in different embodiments. In FIGS. 6, 7, and 8, an embodiment of a portion of a sole structure 436 is shown. Portion of sole structure 436 includes outer member 116, a first ground engaging member 400, and a second ground engaging member 402. Dotted lines represent apertures corresponding to the ground engaging members, including, for example, a first aperture 404 corresponding to first ground engaging member 400, and a second aperture 406 corresponding to second ground engaging member 402.

In FIG. 6, first ground engaging member 400 has an apex 426 at a first height 438, and, as seen in magnified area 408, second ground engaging member 402 has an apex 426 at a second height 440. In some embodiments, the height of each apex 426 lies generally in the vertical plane of the outer member and extends from the bottom side of outer member toward the ground. Second ground engaging member 402 also includes a first hinge portion 410, a second hinge portion 412, a third hinge portion 414, a fourth hinge portion 416, a fifth hinge portion 418, a sixth hinge portion 420, a seventh hinge portion 422, and an eighth hinge portion 424. Additional hinge portions may be present along the side of second ground engaging member facing away from the viewer. A ninth hinge portion, tenth hinge portion, eleventh hinge portion, and twelfth hinge portion are also included in second ground engaging member 402, but are not shown in this figure.

When a force is applied, for example near the perimeter of the outer member, the heights of the ground engaging members may change. In different embodiments, forces may be compressive or tensioning. In the following figures, forces are shown as tensioning. However, in other embodiments, forces may be compressive. For purposes of this description, the height of a ground engaging member refers to the distance in vertical direction 106 between outer member 116 and the apex of the specific ground engaging member. In FIG. 7, a first force 502 is represented by a set of arrows. As a result of the application of first force 502, the heights of first ground engaging member 400 and second ground engaging member 402 are decreased relative to the embodiment of FIG. 6. For example, first ground engaging member 400 has a third height 504, and, as seen in magnified area 500, second ground engaging member 402 has a fourth height 506. In the embodiments of FIGS. 6 and 7, first height 438 is greater than third height 504, and second height 440 is greater than fourth height 506. During compression, first hinge portion 410, second hinge portion 412, third hinge portion 414, fourth hinge portion 416, fifth hinge portion 418, sixth hinge portion 420, seventh hinge portion 422, eighth hinge portion 424, the ninth hinge portion, the tenth hinge portion, the eleventh hinge portion, and the twelfth hinge portion can each provide an area of flexibility along which second ground engaging member 400 can deform and expand horizontally.

If a different force is applied, the heights of ground engaging members may further change. In FIG. 8, a second force 610 is represented by a set of arrows. Second force 610 is greater than first force 502. As a result of the application of second force 610, the heights of first ground engaging member 400 and second ground engaging member 402 are significantly decreased relative to the embodiments of FIGS. 6 and 7. For example, first ground engaging member 400 has a fifth height 612, and, as seen in magnified area 600, second ground engaging member 402 has an sixth height 614. In the embodiments of FIGS. 6, 7, and 8, third height 504 is less than first height 438, fifth height 612 is less than third height 504, fourth height 506 is less than second height 440, and sixth height 614 is less than fourth height 506. In the embodiment of FIG. 8, as first ground engaging member 400 and second ground engaging member 402 flatten and expand outward, fifth height 612 and sixth height 614 are substantially zero. In some embodiments, ground engaging members may flatten to the extent that portions of sole structure 436 may also become substantially flat and/or even. During compression, first hinge portion 410, second hinge portion 412, third hinge portion 414, fourth hinge portion 416, fifth hinge portion 418, sixth hinge portion 420, seventh hinge portion 422, eighth hinge portion 424, a ninth hinge portion 602, a tenth hinge portion 604, an eleventh hinge portion 606, and a twelfth hinge portion 608 may permit sole structure 436 with a flexibility that enables second ground engaging member 400 to flatten, deform, and expand horizontally.

Thus, as described above, the changes in height, as well as other changes to size and shape of ground engaging members, may be facilitated by hinge portions of each ground engaging member. As various forces are applied to second ground engaging member 402, each hinge portion may provide portions of second ground engaging member 402 with the ability to bend, rotate, or otherwise move, relative to other portions of second ground engaging member 402, or relative to other portions of outer member 116. In some embodiments, in order for apex 426 of second ground engaging member 402 to decrease in height, first hinge portion 410, second hinge portion 412, third hinge portion 414, fourth hinge portion 416, fifth hinge portion 418, sixth hinge portion 420, seventh hinge portion 422, eighth hinge portion 424, ninth hinge portion 602, tenth hinge portion 604, eleventh hinge portion 606, and twelfth hinge portion 608 may each allow a splaying outward of the arm portions of second ground engaging member 402, in particular with respect to the two faces associated with each arm portion. For example, second ground engaging member 402 includes an arm portion 428, which has a first face 430 along one side, a second face 432 (not shown) along the generally opposing side, and a third face 452 along the adjacent arm portion. Fourth hinge portion 416 provides a connecting portion between first face 430 and second face 432 that is flexible and permits rotation of one face with respect to the adjoining face. In some embodiments, this feature provides one means for ground engaging members to splay outward.

Furthermore, in different embodiments, first hinge portion 410, second hinge portion 412, third hinge portion 414, ninth hinge portion 602, tenth hinge portion 604, and twelfth hinge portion 608, and other hinge portions disposed along the base of second ground engaging member 402 may allow a flattening or widening of the arm portions of second ground engaging member 402 with respect to their connection to base areas 272. For example, first arm portion 428 of second ground engaging member 402 includes first face 430 that is adjoining a first base area 434. First hinge portion 410 provides a connecting portion between first face 430 and first base area 434 that is flexible, and permits rotation of first face 430 with respect to first base area 434. In some embodiments, this feature can allow ground engaging members to flatten in the vertical direction and/or expand in the horizontal direction.

In addition, in some embodiments, second ground engaging member 402 includes hinge portions disposed between arm portions that allow flexing and expansion between neighboring arm portions. For example, fifth hinge portion 418, seventh hinge portion 422, and eleventh hinge portion 606 can permit expansion among the three arm portions of second ground engaging member 402.

Thus, in different embodiments, sole structure 436 may experience different types of forces. During wear, foot and ground forces may compress the outer member along a generally vertical direction. In some embodiments, sole structure 436 may be expanded or experience a force so that there is a splaying outward of the geometry of ground engaging member(s). This can typically occur during vertical compression, e.g., as a wearer exerts weight on article 100. For example, as depicted in FIGS. 7 and 8, first force 502 and/or second force 610 can alter the extent of "splayout" or horizontal expansion of first ground engaging member 400 and second ground engaging member 402, particularly in the horizontal direction. In FIG. 6, two arm portions of second ground engaging member 402 form a first angle 442. First angle 442 may also be viewed in a first magnified area 500, as fifth hinge portion 418 facilitates movement of first face 430 and third face 452. In FIG. 7, as a result of first force 502, the two arm portions of second ground engaging member form a second angle 508. A second magnified area 520 depicts fifth hinge portion 418 as it permits rotation and movement of first face 430 relative to third face 452. In this case, second angle 508 is greater than first angle 442. Furthermore, in the embodiment of FIG. 8, the two arm portions of second ground engaging member 402 form a third angle 616 after application of second force 610. As can be seen in third magnified area 620, third angle 616 is greater than second angle 508 and fifth hinge portion 418 has facilitated the movement of first face 430 and third face 450 so that they lie in substantially the same horizontal plane relative to one another.

In one embodiment, third angle 616 may be substantially close to 180 degrees. In other embodiments, forces may differ such that second angle 508 may be greater than third angle 616, and/or first angle 442 is greater than second angle 508. Furthermore, in some embodiments, the horizontal areas of first aperture 404 and second aperture 406 may increase when a force is applied in the vertical direction.

Horizontal tensioning forces may also contribute to the expansion of ground engaging members. For example, when a ground engaging member experiences a horizontal tension due to friction with a ground surface, the ground engaging member may expand both in the direction of the tension, as well as in a direction perpendicular to the tension.

In some embodiments, the increased "splay-out" of first ground engaging member 400 and/or second ground engaging member 402 may alter the size, shape, and/or other characteristics of sole structure 436. For example, in FIG. 6, the depicted portion of sole structure 436 has a third length 444, and a third width 446. When one or more ground engaging members are compressed, as by first force 502 in FIG. 7, the depicted portion of sole structure 436 has an increased fourth length 510, and an increased fourth width 512. In FIG. 8, the depicted portion of sole structure 436 has a fifth length 618 that is greater than fourth length 510, and a fifth width 622 that is greater than fourth width 512. The flattening or splaying of different ground engaging members may thus change, expand, or increase the area of sole structure 436 in some embodiments. In one embodiment, the length of sole structure 436 may expand to the same extent as the width of sole structure 436 as a result of an applied force. In other embodiments, the length of sole structure 436 may not increase as much as the width of sole structure 436. For example, in some embodiments, fourth length 510 may expand or increase more relative to the expansion that occurs along fourth width 512 in response to the same force. In another embodiment, the width of sole structure 436 may not increase as much as the length of sole structure 436. For example, in some embodiments, fourth width 512 may expand or increase more relative to the expansion that occurs along fourth length 510 in response to the same force. Thus, the auxetic properties of the ground engaging members may allow various levels of expansion to sole structure 436 that increase its size in the horizontal direction.

Figure 9:
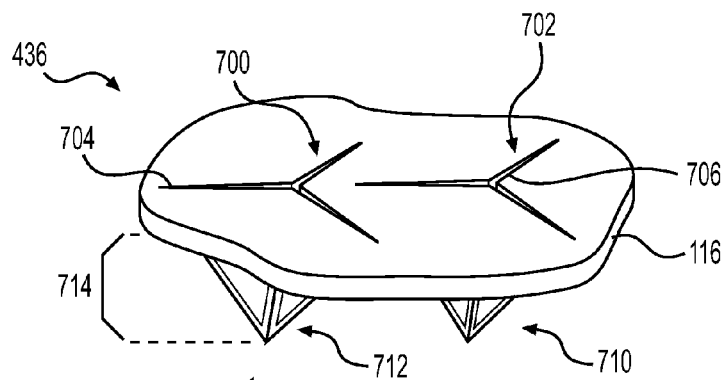
FIG. 9 is an isometric view of the inner surface of an embodiment of a portion of the sole structure.
Figure 10:
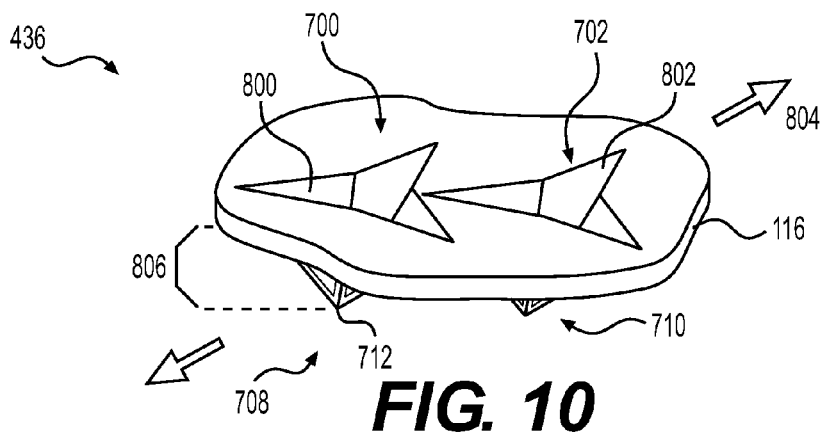
FIG. 10 is an isometric view of the inner surface of an embodiment of a portion of the sole structure.
Figure 11:
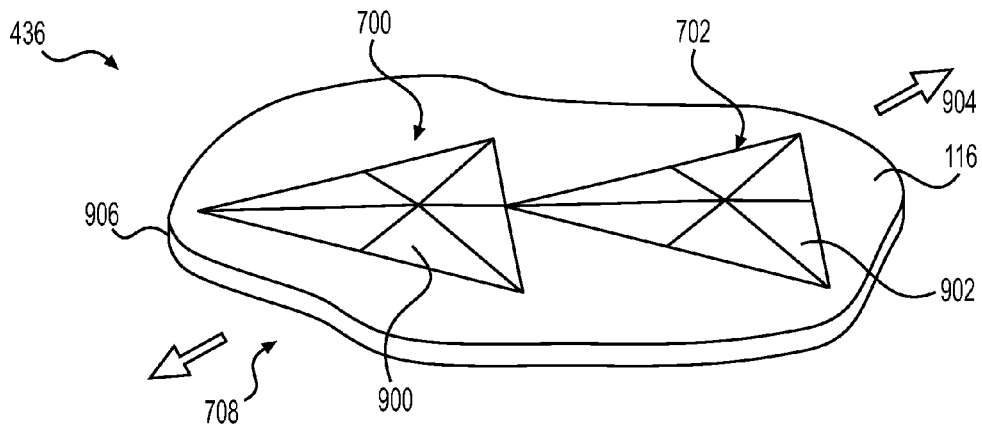
FIG. 11 is an isometric view of the inner surface of an embodiment of a portion of the sole structure.
Figure 12:
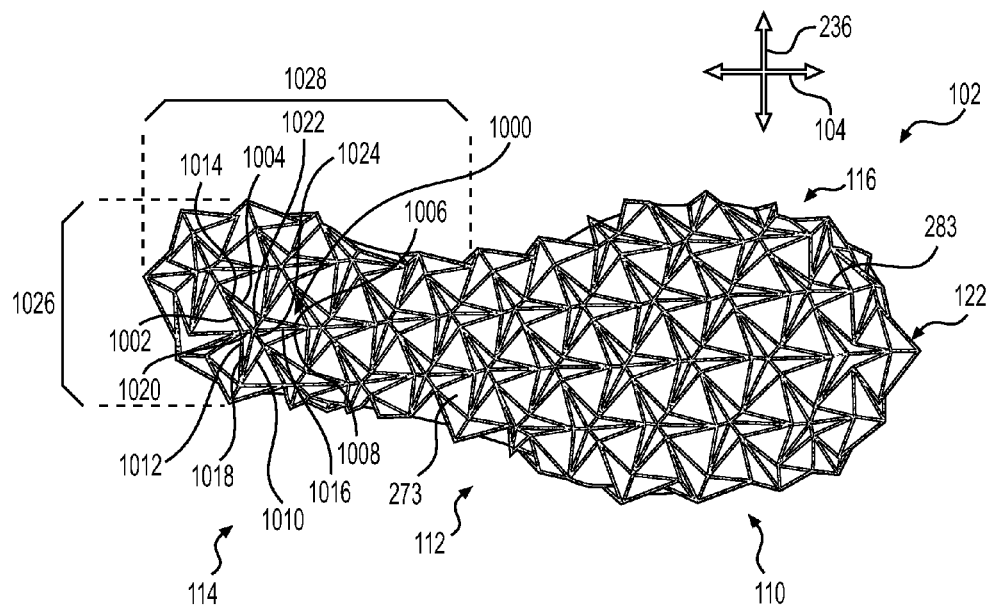
FIG. 12 is an illustration of the outer surface of an embodiment of a sole structure for an article of footwear.

Deformation and auxetic structural changes may also occur along the inner surface of sole structure 102. FIGS. 9, 10, and 11 depict a cutaway portion of an embodiment of the inner surface of a sole structure 436. In FIGS. 9, 10, and 11, a first aperture 700 and a second aperture 702 in sole structure 436 are depicted, with portions of corresponding first ground engaging member 708 and second ground engaging member 710 visible below sole structure 436. In FIG. 9, first aperture 700 has an opening with a first area 704, and second aperture 702 similarly has an opening with a second area 706. In some embodiments, the openings lie generally in the horizontal plane along the inner surface of outer member 116. The area of each opening may be enclosed or demarcated by the perimeter edges of each aperture.

When a force is applied, for example near the perimeter of outer member 116, the areas of the openings of first aperture 700 and second aperture 702 may change in some embodiments. In FIG. 10, a fourth force 804 is represented by a set of arrows. As a result of the application of fourth force 804, the areas of first aperture 700 and second aperture 702 have increased. The opening of first aperture 700 has a third area 800, and the opening of second aperture 802 has a fourth area 802. Third area 800 is greater than first area 704 and fourth area 802 is greater than second area 706.

If a different force is applied, the areas of the openings of apertures may further change. When a fifth force 904 (represented by arrows) is applied in FIG. 11, for example near the perimeter of outer member 116, the areas of the openings of first aperture 700 and second aperture 702 may change in some embodiments. In FIG. 11, fifth force 904 is represented by a set of arrows. As a result of the application of fifth force 904, the areas of first aperture 700 and second aperture 702 have increased. The opening of first aperture 700 has a fifth area 900, and the opening of second aperture 702 has a sixth area 902. Fifth area 900 is greater than third area 800 and sixth area 902 is greater than fourth area 802. In one embodiment, first aperture 700 and/or second aperture 702 may expand to the extent that they encompass the inner surface of first ground engaging member 708 and second ground engaging member 710. Thus, in some embodiments, a force may cause sole structure 436 to expand so that apertures are "filled in" by their corresponding ground engaging members, and sole structure 436 is at least partially flattened. In one embodiment, as seen in FIG. 10, apertures may expand to an extent that they merge with their corresponding flattened ground engaging members.

Thus, in some embodiments, the shape and/or depth of the apertures may also change. Depending on the magnitude and the direction of the force(s) applied, the changes in area, depth, or shape may vary. In some embodiments, a different force may permit an expansion of the aperture areas. For example, in one embodiment, sole structure 436 may be exposed to a force whereby third area 800 is less than first area 704, and/or fourth area 802 is less than second area 706. In one embodiment, the area of an aperture may increase when a force is applied.

It should be noted that tensioning forces applied in the lateral direction, as seen in FIGS. 9, 10, and 11, may also result in similar changes in ground engaging member shapes, sizes, heights and/or area of outer member 116. Depending on the magnitude and the direction of the force(s) applied, changes in area or shape may vary. For example, a tension may be applied to or along the sides of sole structure 436, and may result in the splaying-out of ground engaging members. This can lead to a decrease in the height of the apex, which can create expansion in sole structure 436. Thus, forces in the vertical, horizontal, and/or other direction may result in expansion in multiple directions.

Exposure to various forces may produce a change in the shape or geometry, size, and/or height of ground engaging members. In FIG. 9, first ground engaging member 708 has an apex 712 at a seventh height 714. In some embodiments, the height of apex 712 lies generally in the vertical plane of sole structure 436 and extends from the bottom side of sole structure 436 toward the ground. For example, when fourth force 804 and/or a fifth force 904 are applied, the height of first ground engaging member 708 may change. In FIG. 10, the height of apex 712 of first ground engaging member 708 is decreased to an eighth height 806. In the embodiments of FIGS. 9 and 10, eighth height 806 is less than seventh height 714. In FIG. 11, as a result of fifth force 904, the height of first ground engaging member 708 has decreased to ninth height 906. First ground engaging member 708 has decreased in height to the extent that the apex is no longer visible to the viewer. In some embodiments, ground engaging members may be compressed to the extent that their height is nearly zero, and the ground engaging members become substantially flattened in the horizontal plane.

In some embodiments, a different force may permit ground engaging member(s) to increase in height. In some embodiments, eighth height 806 may be substantially similar to or greater than seventh height 714 as various forces are applied to article of footwear 100. In one embodiment, sole structure 436 may be exposed to a force whereby eighth height 806 is greater than seventh height 714, and/or ninth height 906 is greater than eighth height 806. In some embodiments, the overall geometry of the ground engaging members may also change. Depending on the magnitude and the direction of the force(s) applied, changes in area or shape may vary. In some embodiments, a different force may permit a compression of the ground engaging member(s) in the horizontal direction, rather than an expansion. For example, in one embodiment, sole structure 436 may be exposed to a force whereby ninth height 906 is greater than eighth height 806.

Figure 13:
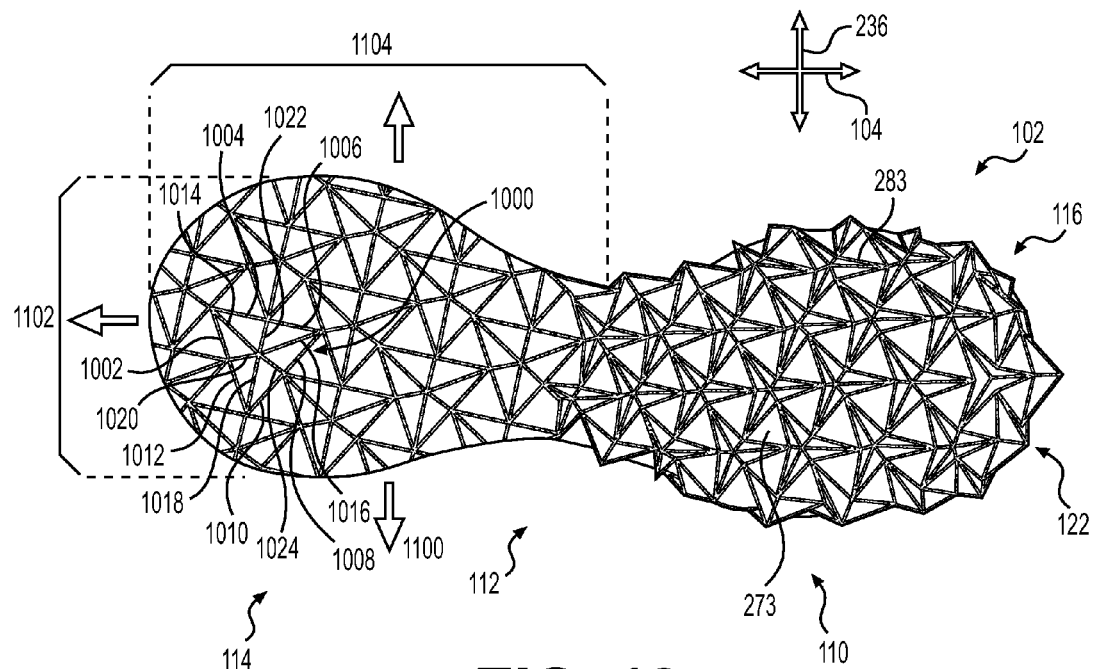
FIG. 13 is an illustration of the outer surface of an embodiment of a sole structure for an article of footwear.

In some embodiments, sole structure 102 may change shape, size, or expand in the horizontal direction, as described with reference to FIGS. 6-11. For example, in FIG. 12, a sole structure 102 at rest (i.e., with no application of external net forces) may have a sixth width 1026 along lateral direction 236 and a sixth length 1028 along longitudinal direction 104 of heel region 114. As a sixth force 1100 (represented by arrows) is applied around heel region 114 of sole structure 102 in FIG. 13, there may be an expansion of sole structure 102 in the horizontal plane. In FIG. 13, as a result of sixth force 1100, sole structure 102 has an increased seventh width 1102 and an increased seventh length 1104 along heel region 114. For example, a ninth ground engaging member 1000 disposed in heel region 114 includes a first hinge portion 1002, a second hinge portion 1004, a third hinge portion 1006, a fourth hinge portion 1008, a fifth hinge portion 1010, a sixth hinge portion 1012, a seventh hinge portion 1014, an eighth hinge portion 1016, a ninth hinge portion 1018, a tenth hinge portion 1020, an eleventh hinge portion 1022, and a twelfth hinge portion 1024 that may each allow a splaying outward of the arm portions of ninth ground engaging member 1000. Neighboring ground engaging members 122 in heel region 114 may also rotate or unfold around their respective hinge portions 283 when exposed to a force. In other embodiments, there may be an applied force whereby the width and length of sole structure decrease and hinge portions 283 fold.

Figure 14:
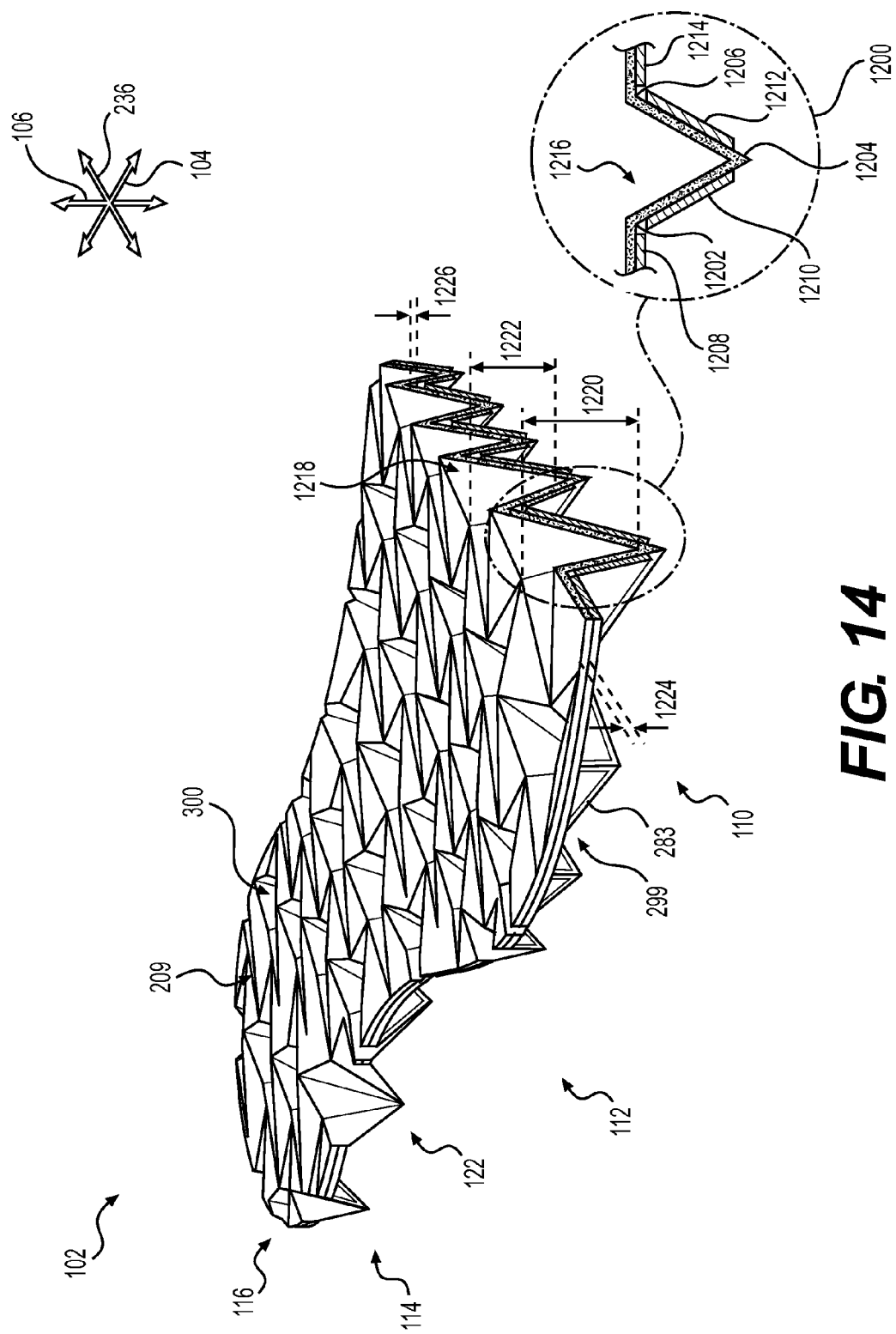
FIG. 14 is a schematic cross-section illustration of an embodiment of the sole structure shown in FIG. 5.
Figure 15:
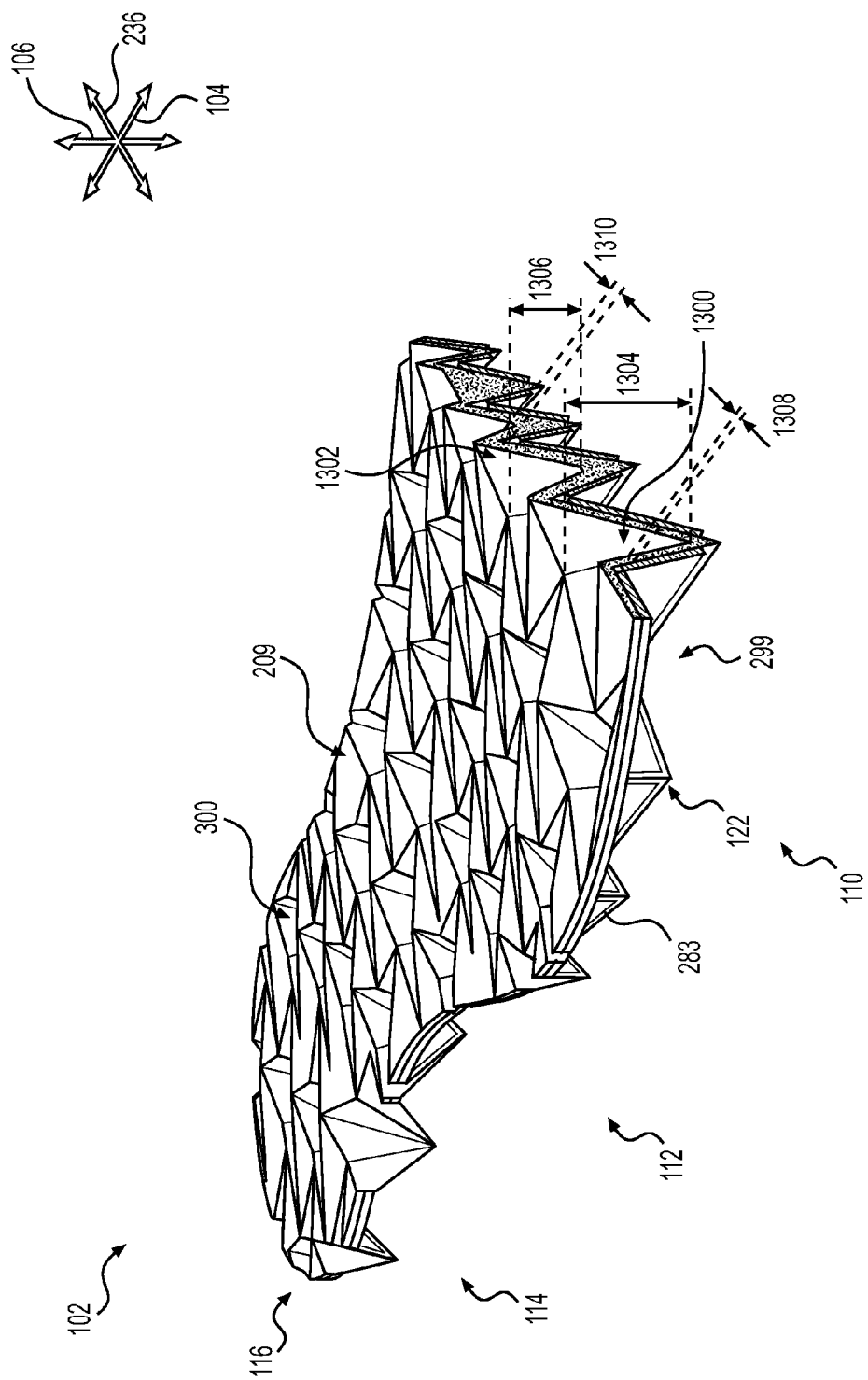
FIG. 15 is a schematic cross-section illustration of an embodiment of the sole structure shown in FIG. 5.

In different embodiments, the depths associated with apertures 300 may vary. FIGS. 14 and 15 depict a cross-section of the embodiment shown in FIG. 5, along the line labeled FIG. 14. In FIG. 14, a first aperture 1216 is seen in an enlarged view 1200, depicting a first hinge portion 1202, a second hinge portion 1204, and a third hinge portion 1206. Adjacent to the hinge portions are a first panel 1208, a first face 1210, a second face 1212, and a second panel 1214. In FIG. 14, it may be seen that the average depth of apertures 300 may be substantially uniform throughout sole structure 102. For example, in FIG. 14, a first depth 1220 of first aperture 1216 is substantially similar to a second depth 1222 of a second aperture 1218. In other embodiments, there may be differences in the average depth of each aperture. In one embodiment, apertures 300 may extend to a greater depth, where the material comprising outer member 116 is relatively thin. This may permit greater bendability in ground engaging member 122. In another embodiment, depth of apertures 300 may be relatively shallow, so that the material comprising outer member 116 is relatively thick. This may lower the rate of bending in sole structure 102.

In another embodiment, one or more apertures 300 may be "filled in" to some extent, so that they are at least partially solid rather than hollow. This may permit ground engaging members 122 to have greater stiffness and provide a more firm response in movements requiring traction. In FIG. 15, for example, a third depth 1304 of a first aperture 1300 is less than a fourth depth 1306 of a second aperture 1302. In other embodiments, third depth 1304 may be greater than fourth depth 1306. Changing the thickness of apertures 300 in various regions of sole structure 102 may also provide different regions of sole structure 102 with customized or distinct areas of greater or lesser flexibility.

Similarly, the thickness associated with outer member 116 may vary in different embodiments. In FIG. 14, it may be seen that the thickness of outer member 116 is substantially uniform throughout sole structure 102. For example, in FIG. 14, a first thickness 1224 is substantially similar to a second thickness 1226. In other embodiments, there may be differences in the average thickness of outer member 116 in different regions, allowing variations in the flexibility of sole structure 102. In one embodiment, for example, outer member 116 may be thicker in forefoot region 110 than in heel region 114 or midfoot region 112. This may permit greater flexibility to the area of the foot associated with forefoot region 110. In FIG. 15, a third thickness 1308 is less than a fourth thickness 1310. In other embodiments, third thickness 1308 may be greater than fourth thickness 1310.

Figure 16:
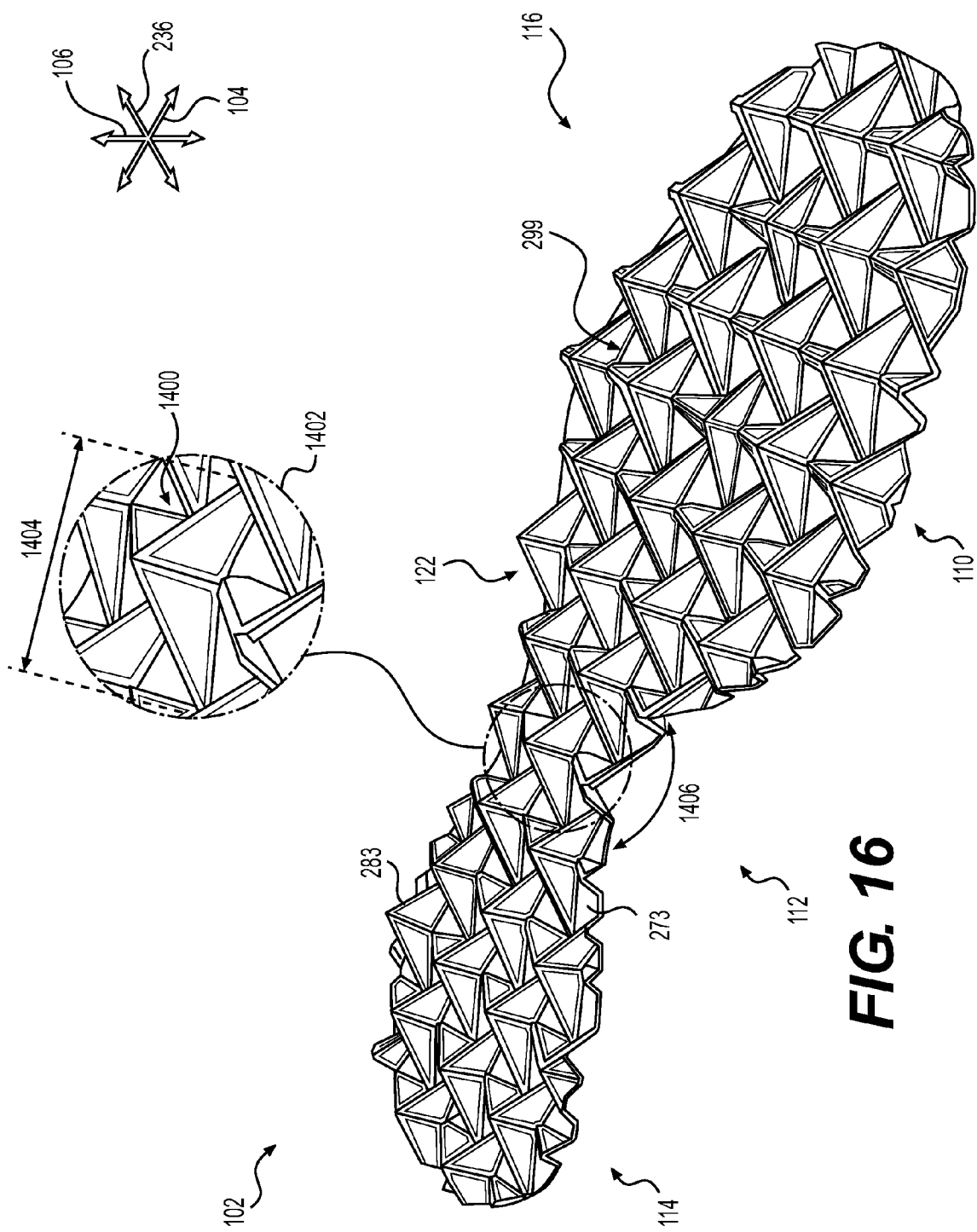
FIG. 16 is an isometric view of the outer surface of an embodiment of a sole structure with ground engaging members for an article of footwear.
Figure 17:
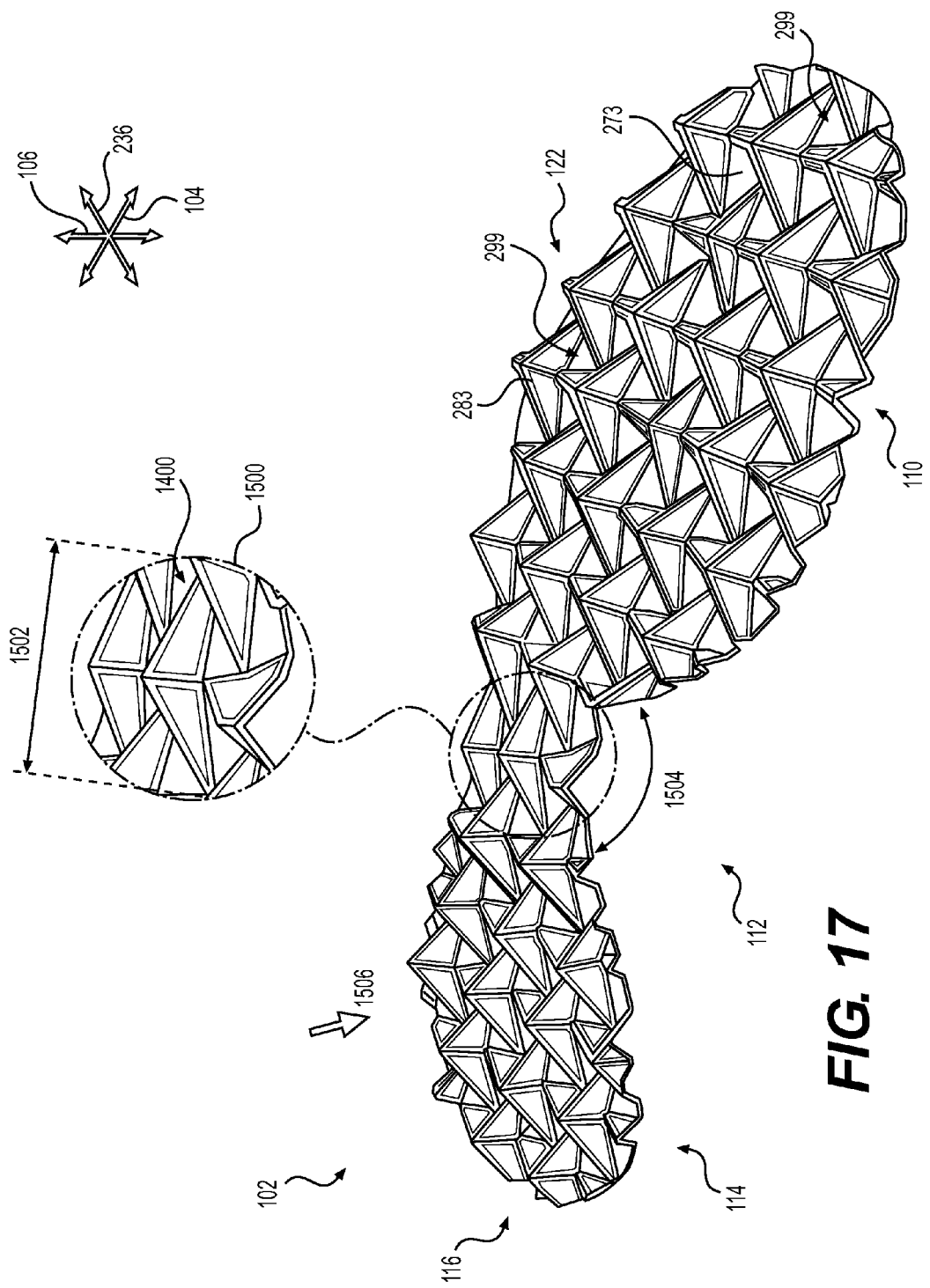
FIG. 17 is an isometric view of the outer surface of an embodiment of a sole structure with ground engaging members for an article of footwear.
Figure 18:
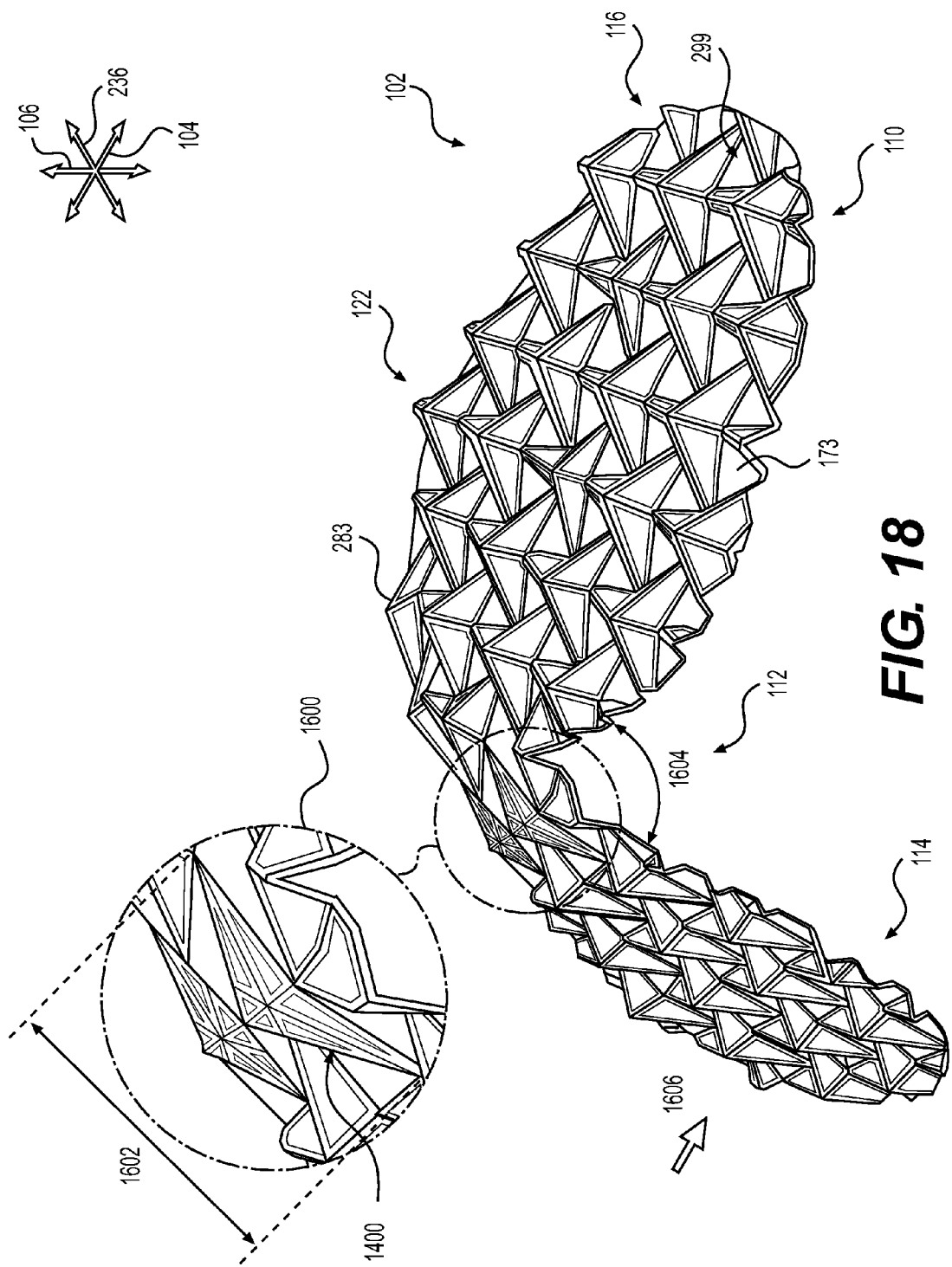
FIG. 18 is an isometric view of the outer surface of an embodiment of a sole structure with ground engaging members for an article of footwear.

FIGS. 16-18 depict an isometric view of the bottom (outer surface 299) of sole structure 102. In different embodiments, sole structure 102 may include the ability to compress and deform to various degrees. In some embodiments, as a result of the application of deformation, ground engaging members 122 may expand so that there is greater "splay out" of ground engaging members 122. In such a case, the apex of a ground engaging member may decrease in height, and/or the arm portions of the same ground engaging member may expand in average width. In some embodiments, outer member 116 may also expand or stretch, such that base areas 272 become wider or longer.

It should be noted that the various degrees of bending and/or expansion described and shown here are for purposes of illustration. In some situations sole structure 436 may not undergo compression to the extent depicted, or may bend less, depending on various factors such as the materials used in the production of outer member 116 or base segments 207, the manner of attachment to upper 108, or other factors. For example, if the outer member is joined or attached to a less reactive material, the tensioning, compressive and/or expansive properties described herein may differ, or be limited. In some embodiments, when the outer member is joined to a strobel or other structure, the capacity of expansion may decrease. In some embodiments, the perimeter of outer member 116 may be fixed, e.g., bonded to a strobel layer. However, in such embodiments the auxetic structure of outer member 116 may still facilitate increased flexibility for portions of outer member 116 even though the dimensions of the perimeter of outer member 116 may not change.

As shown in FIGS. 16, 17, and 18, in some embodiments, a force may be applied such that one or more regions of sole structure 102 are bent or deformed. The material(s) selected for outer member 116, faces 201, and/or panels 273 may permit variation in the degree of possible bending. In FIG. 16, sole structure 102 is at rest, and midfoot region 112 has a first angle 1406. In one embodiment, first angle 1406 may be approximately 180 degrees. In FIG. 17, as a result of a first force 1506 (represented by an arrow), sole structure 102 is bent around midfoot region 112 to form a second angle 1504. In the embodiment of FIG. 17, second angle 1504 is smaller than first angle 1406. Sole structure 102 has been deformed in a downward orientation from midfoot region 112 so that heel region 114 is lower relative to the other regions of sole structure 102. In FIG. 18, as a result of a second force 1606 (represented by an arrow), sole structure 102 is bent further around midfoot region 112, forming third angle 1604. In the embodiment of FIG. 18, third angle 1604 is less than second angle 1504. In other embodiments, second angle 1594 and/or third angle 1604 may be greater or smaller, depending on the force applied and the materials comprising sole structure 102.

In the embodiment of FIG. 16, a tenth ground engaging member 1400 is shown in a magnified area 1402 of sole structure 102. Tenth ground engaging member 1400 has a first width of 1404. When midfoot region 112 of sole structure 102 is bent downward, tenth ground engaging member 1400 expands along hinge portions 283 to permit bending. In FIG. 17, width of tenth ground engaging member 1400 has become relatively wider, and can be seen in magnified area 1500 as expanded to a larger second width 1502. In FIG. 18, as a result of further bending, width of tenth ground engaging member 1400 has extended to a third width 1602, which is greater than second width 1502. In addition, tenth ground engaging member 1400 has become relatively flatter in order to accommodate the bending or expansion of sole structure 102.

Thus, in different embodiments, in response to tensioning or other forces, ground engaging members 122 may expand so that one or more ground engaging members 122 "splay out" and increase in surface area along the horizontal plane. In such a case, the apex of the ground engaging member may decrease in height, while the arm portions of the same ground engaging member may expand in their average width. In some cases, this expansion occurs in the horizontal direction. In some embodiments, sole structure 102 may also expand. This may permit extension of sole structure 102 in a way that promotes higher flexibility of article 100. Such flexibility can be important to a wearer in order to achieve increased foot mobility. With greater flexibility, impedances to movement may be minimized.

In different embodiments, ground engaging members 122 may be utilized at any suitable location of sole structure 102. In some embodiments, ground engaging members 122 having particular shapes and configurations may be disposed at regions of sole structure 102 corresponding with various anatomical portions of the foot. Furthermore, in some embodiments, article 100 may include greater or fewer ground engaging members 122 as desired to provide performance characteristics suitable for the desired use.

Figure 19:
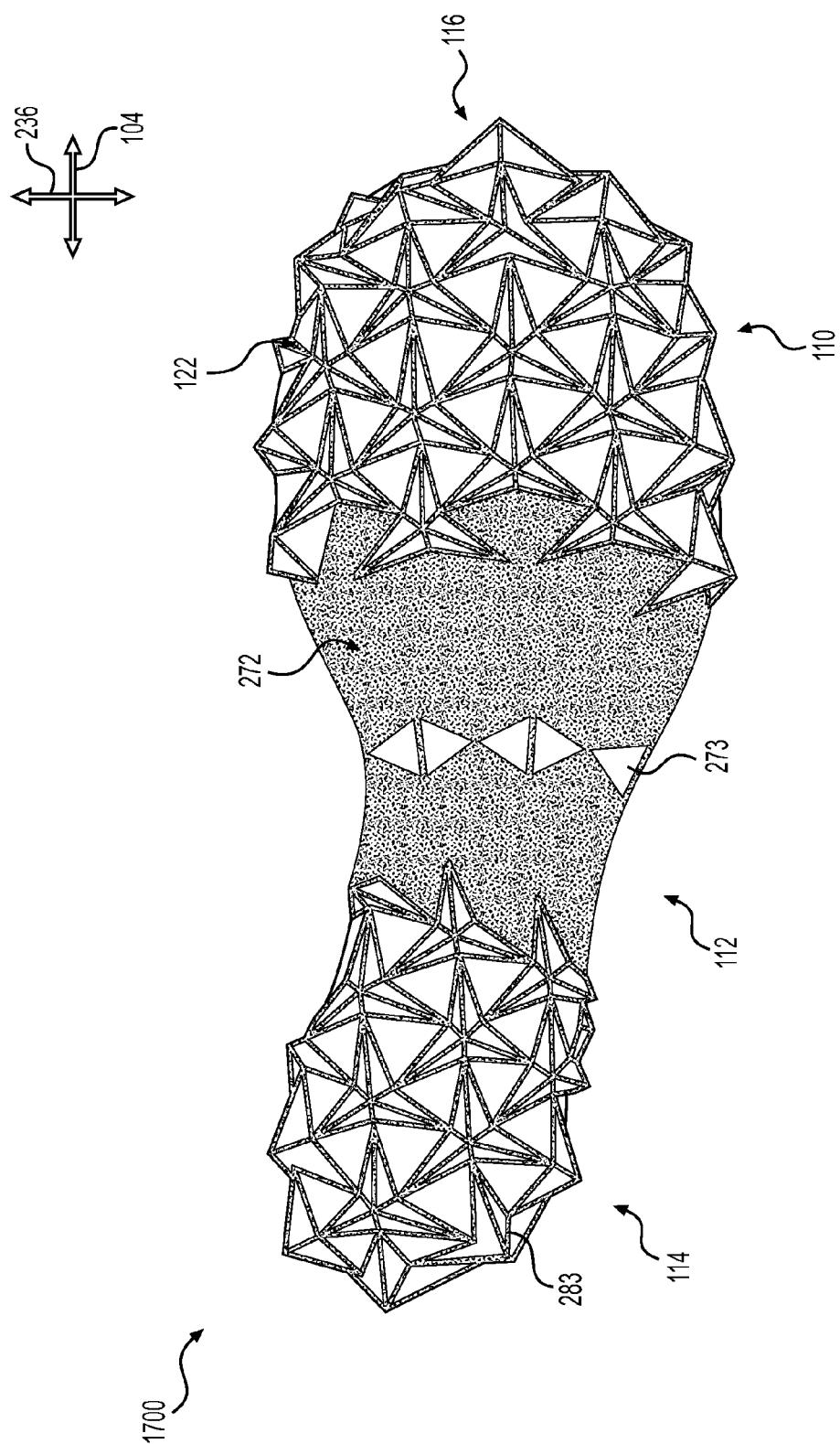
FIG. 19 is a schematic illustration of the outer surface of an embodiment of a sole structure with ground engaging members for an article of footwear.

For example, as illustrated in FIG. 19, one or more ground engaging members 122 may be disposed in areas that correspond with forefoot region 110 and heel region 114 of a sole structure 1700. An athlete may place a significant amount of their weight on these regions during certain movements, such as cutting in a lateral direction 236, or during abrupt stopping. In some embodiments, as seen in FIG. 19, some areas of sole structure 1700 may also include panels 273, disposed here along midfoot region 112 of outer member 116, independent from neighboring ground engaging members 122.

In some embodiments, there may be relatively larger regions of outer member material, providing increased flexibility to that region. For example, in FIG. 19, midfoot region 112 may be more flexible than heel region 114 or forefoot region 110. In other embodiments, forefoot region 110 may have a reduced number of ground engaging members 122, in order to provide sole structure with even greater flexibility along forefoot region 110. Such portions may include at least one ground engaging member 122 in order to provide traction in lateral direction 236. However, an article that includes ground engaging members 122 in forefoot region 110 and/or other regions, as depicted in FIG. 19, may nevertheless continue to provide a high level of flexibility, due to the construction of sole structure 1700 described herein.

In different embodiments, the configuration of the sole structure may vary significantly according to one or more types of ground surfaces on which the sole structure may be used. Accordingly, the sole structure may be configured to provide traction on various surfaces, such as natural turf (e.g., grass), synthetic turf, dirt, snow. In some embodiments, the sole structure may also vary based on the properties and conditions of the surfaces on which article 100 is anticipated to be used. For example, the sole structure may vary depending on whether the surface is harder or softer. In addition, the sole structure may be tailored for use in wet or dry conditions. In other embodiments, the configuration of the sole structure, including the traction pattern, may vary significantly according to the type of activity for which article 100 is anticipated to be used (for example, running, soccer, baseball, football, and other activities), as described further below.

Figure 20:
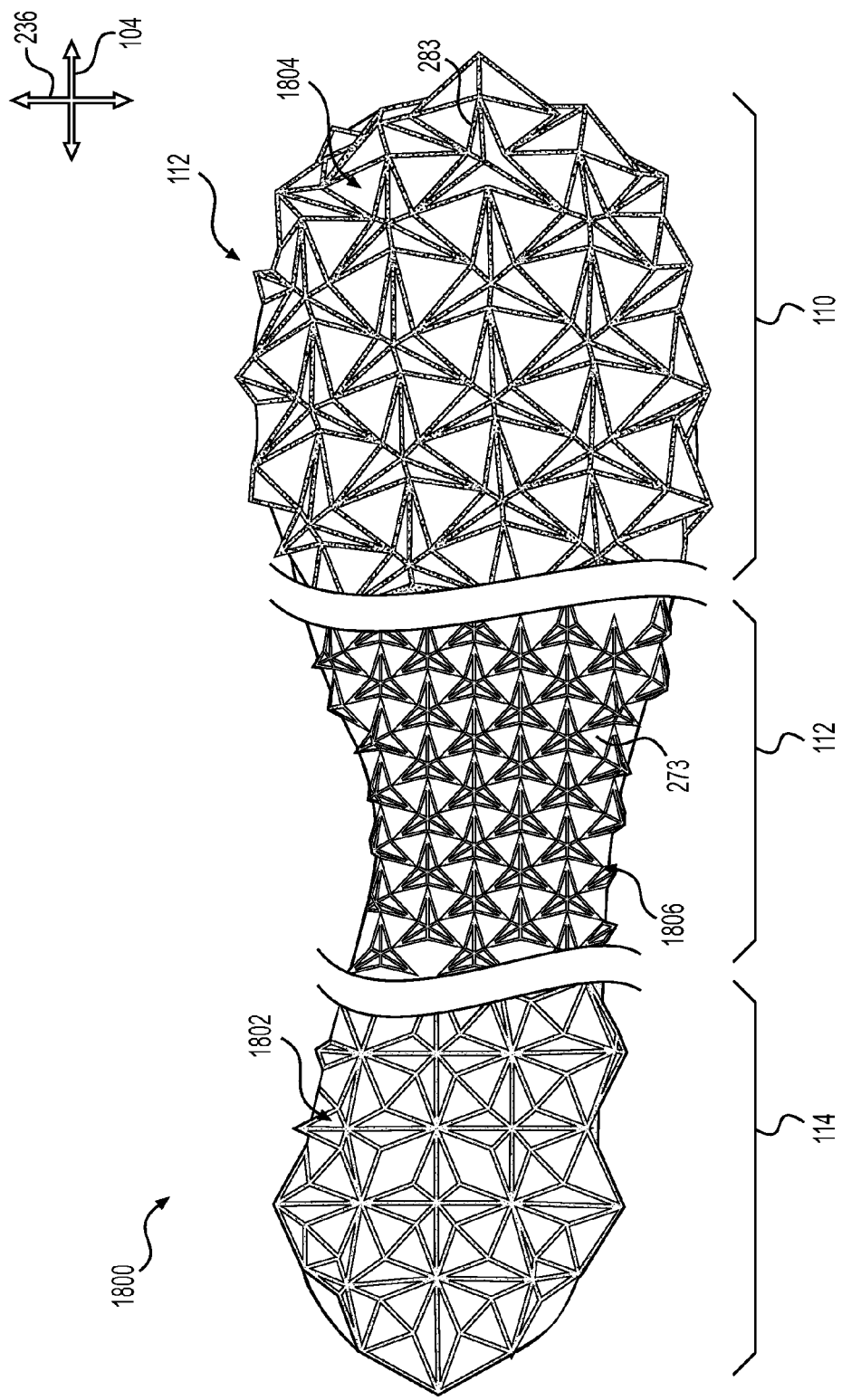
FIG. 20 is a schematic illustration of the outer surface of an embodiment of a sole structure with ground engaging members for an article of footwear.

In some embodiments, as illustrated in FIG. 20, a sole structure 1800 may be configured for versatility. For example, sole structure 1800 may be configured to provide traction and stability on a variety of surfaces, having a range of properties, and/or under various conditions. In another embodiment, a versatile embodiment of sole structure 1800 may include both larger and medium sized ground engaging members 122, and/or ground engaging members 122 having moderately to minimally aggressive shapes, and disposed in different regions of sole structure 1800. In FIG. 20, for example, a series of larger four-pointed diamond shaped ground engaging members 1802 are disposed in heel region 114, and three-pointed star shaped ground engaging members 1804 are disposed in forefoot region 110. Furthermore, a number of smaller three-pointed star shaped ground engaging members 1806 are disposed in midfoot region 112. While the number, size, and shape of ground engaging members 122 are provided as examples, other structural parameters may be varied in order to tailor article 100 for traction and stability on various surfaces, and/or in a variety of conditions. Additional such parameters may include, for example, the use of secondary traction elements, placement of ground engaging members 122, the relative softness or hardness of the ground engaging members 122 and/or sole structure 102 in general, the relative flexibility of portions of sole structure 102, and other such parameters.

In some cases, it may be advantageous to provide increased torsional traction on one foot, and to provide decreased torsional traction on the other foot to enable greater freedom of motion. That is, it may be desirable to provide one or more portions of the rear foot with a reduced amount of torsional traction and provide one or more portions of the front foot with an increased amount of torsional traction. Accordingly, in some embodiments, asymmetric outer members may be provided for left and right feet. That is, sole structure 102 for a left foot may be a non-mirror image of the sole structure for a right foot.

While various embodiments have been described, the description is intended to be exemplary, rather than limiting and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

What is claimed is:

1. A sole structure for an article of footwear, the sole structure comprising:
- an outer member;
- a plurality of ground engaging members extending from a base portion of the outer member, the plurality of ground engaging members comprising at least a first ground engaging member;
- the first ground engaging member comprising at least a first arm portion and a second arm portion, the first arm portion including a first face and a second face, the second arm portion including a third face and a fourth face, wherein each of the first face, the second face, the third face, and the fourth face is substantially flat and comprise a substantially triangular shape;
- wherein the first face, the second face, the third face, and the fourth face are spaced apart from one another;
- wherein the first face is attached to the base portion of the outer member and wherein the second face is attached to the base portion of the outer member;
- wherein a first hinge portion extends between the first face and the second face, wherein a second hinge portion extends between the second face and the third face, wherein the first hinge portion comprises an exposed portion of the base portion, wherein the second hinge portion comprises an exposed portion of the base portion;
- wherein the first face and the second face can rotate with respect to each other about the first hinge portion;
- wherein the second face and the third face can rotate with respect to each other about the second hinge portion;
- wherein the first face and the second face rotate away from one another when a tensioning force is applied at the first hinge portion;
- wherein the first face has a first hardness, and the base portion has a second hardness, wherein the first hardness is different from the second hardness; and
- wherein the sole structure at least partially comprises an auxetic structure, and wherein the plurality of ground engaging members are arranged on the outer member to provide the sole structure with the auxetic structure.

2. The sole structure of claim 1, wherein the first ground engaging member includes a first configuration and a second configuration, wherein the first ground engaging member includes an apex that extends downward from the base portion in the first configuration, wherein the first ground engaging member is substantially planar with respect to the base portion in the second configuration, and wherein the first hinge portion and the second hinge portion facilitate the transition of the ground engaging member between the first configuration and the second configuration.

3. The sole structure of claim 2, wherein a first panel is attached to the base portion adjacent to the first ground engaging member, the first panel having a substantially triangular shape, wherein a third hinge portion extends between the first face and the first panel, wherein the third hinge portion comprises an exposed portion of the base portion, and wherein the first face and the first panel can rotate with respect to each other about the third hinge portion.

4. The sole structure of claim 3, wherein the first panel comprises a third hardness, and wherein the third hardness is different from the second hardness.

5. The sole structure of claim 1, wherein the first hardness is substantially greater than the second hardness.

6. The sole structure of claim 4, wherein the third hardness is substantially greater than the second hardness.

7. The sole structure of claim 6, wherein the third hardness is substantially similar to the first hardness.

8. The sole structure of claim 2, wherein the first ground engaging member includes a central region, and the first arm portion, the second arm portion, and a third arm portion extend radially from the central region, wherein the first arm portion and the second arm portion are adjacent and form a first obtuse angle in the first configuration, the second arm portion and the third arm portion are adjacent and form a second obtuse angle in the first configuration, and the third arm portion and the first arm portion are adjacent and form a third obtuse angle in the first configuration.

9. The sole structure of claim 8, wherein the magnitudes of the first obtuse angle, the second obtuse angle, and the third obtuse angle are substantially equivalent.

10. The sole structure of claim 8, wherein the magnitudes of the first obtuse angle, the second obtuse angle, and the third obtuse angle change in response to a force.

11. The sole structure of claim 8, further including a second ground engaging member substantially similar to the first ground engaging member, wherein the second ground engaging member includes a first arm portion, wherein the first arm portion of the second ground engaging member ends in a vertex, wherein the vertex is disposed in an area defined by the third obtuse angle of the first ground engaging member, and wherein the vertex is substantially adjacent to the central region of the first ground engaging member.

12. The sole structure of claim 8, wherein the outer member includes an inner surface, and the inner surface includes a plurality of apertures in the first configuration, and wherein the inner surface is substantially continuous in the second configuration.

13. The sole structure of claim 12, wherein the plurality of apertures include a first aperture, and the first aperture has an aperture area in a substantially horizontal plane, and the aperture area changes in response to a tensioning force.

14. An article of footwear, including an upper and a sole structure, the sole structure including:
- an outer member;
- a plurality of ground engaging members disposed along a base portion of the outer member, the plurality of ground engaging members including a first ground engaging member, a second ground engaging member, and a third ground engaging member;
- a plurality of panels attached to the base portion of outer member, the plurality of panels comprising at least a first panel, the first panel being at least partially bounded by the first ground engaging member, the second ground engaging member, and the third ground engaging member;
- the first ground engaging member comprising a hollow interior region in a first configuration, wherein the hollow interior region is open on an inner side of the outer member, providing the outer member with a first aperture that is disposed on the inner side of the outer member;
- wherein the sole structure at least partially comprises an auxetic structure, wherein the first ground engaging member, the second ground engaging member, and the third ground engaging member expand horizontally upon compression and transition to a second configuration;

the first aperture having a three-pointed star cross-sectional shape in a horizontal plane in the first configuration, and wherein the portion of the inner side of the outer member that is associated with the first aperture comprises a substantially flat, continuous surface when the first ground engaging member is in the second configuration; and wherein the first ground engaging member moves about a first hinge portion relative to the first panel upon expansion of the first ground engaging member, wherein the second ground engaging member moves about a second hinge portion relative to the first panel upon expansion of the second ground engaging member, and wherein the third ground engaging member moves about a third hinge portion relative to the first panel upon expansion of the third ground engaging member.

15. The sole structure of claim 14, wherein the first ground engaging member includes a plurality of faces, including a first face.

16. The sole structure of claim 15, wherein the first panel has a first hardness and the outer member has a second hardness, and the first hardness is substantially greater than the second hardness.

17. The soles structure of claim 16, wherein the first face has a third hardness, and the third hardness is substantially similar to the first hardness.

18. The soles structure of claim 16, wherein the first face has a third hardness, and the third hardness is different from the first hardness.

19. The article of footwear of claim 14, wherein an inner surface of the outer member includes a plurality of apertures, and wherein each aperture in the plurality of apertures align in the vertical direction with a ground engaging member in the plurality of ground engaging members.

20. The article of footwear of claim 15, wherein the outer member has a first thickness and the first face has a second thickness, and the first thickness is substantially the same as the second thickness.

21. The article of footwear of claim 15, wherein the outer member has an approximately constant thickness.

22. The article of footwear of claim 14, wherein the shape of the first panel is generally triangular.

23. The article of footwear of claim 14, wherein in response to a tensioning force the first ground engaging member becomes substantially flat.

24. The sole structure of claim 19, wherein the inner surface further includes a second aperture, and the depth of first aperture is less than the depth of the second aperture.

25. The sole structure of claim 14, wherein the sole structure includes a forefoot region and a heel region, and the thickness of the outer member in the forefoot region is less than the thickness of the outer member in the heel region.

* * * * *